United States Patent
Han et al.

(10) Patent No.: US 7,881,164 B1
(45) Date of Patent: Feb. 1, 2011

(54) SYNC MARK DETECTION WITH POLARITY UNCERTAINTY

(75) Inventors: Ke Han, Fremont, CA (US); Zining Wu, Los Altos, CA (US)

(73) Assignee: Marvell International Ltd., Hamilton (BM)

( * ) Notice: Subject to any disclaimer, the term of this patent is extended or adjusted under 35 U.S.C. 154(b) by 632 days.

(21) Appl. No.: 11/906,655

(22) Filed: Oct. 2, 2007

Related U.S. Application Data

(60) Provisional application No. 60/827,780, filed on Oct. 2, 2006.

(51) Int. Cl.
  *G11B 7/00* (2006.01)
  *G11B 5/09* (2006.01)
  *G11B 20/10* (2006.01)
  *G11B 5/035* (2006.01)

(52) U.S. Cl. .................. 369/44.11; 360/51; 360/54; 360/39; 360/65

(58) Field of Classification Search .............. 369/53.3, 369/59.17, 110.01; 360/66, 51, 59, 45, 48, 360/316, 328
See application file for complete search history.

(56) References Cited

U.S. PATENT DOCUMENTS 6,278,568 B1 * 8/2001 Cloke et al. .............. 360/51
2005/0046986 A1 * 3/2005 Dunn .......................... 360/39

* cited by examiner

*Primary Examiner*—Jason C Olson
*Assistant Examiner*—Nicholas Lee

(57) ABSTRACT

Systems and methods for detecting a disk sync mark are provided. The systems and methods for detecting the disk sync mark rely on a detecting the disk sync mark on at least one timing interval. A window of data read bits from a particular disk sector are examined to determine whether they match the disk sync mark. The disk sync mark may be differentiated from expected versions of the disk sync mark using a calculated set of thresholds.

57 Claims, 15 Drawing Sheets

SYNC MARK DETECTION WITH POLARITY UNCERTAINTY

CROSS REFERENCE TO RELATED APPLICATIONS

This claims the benefit of copending, commonly-assigned U.S. Provisional Patent Application No. 60/827,780 filed Oct. 2, 2006, which is hereby incorporated by reference herein in its entirety.

BACKGROUND OF THE INVENTION

Embodiments of the invention generally pertain to systems and methods for detecting data on a machine-readable storage medium. In particular, embodiments of the invention pertain to systems and methods for detecting a sync mark for data in a data storage system.

Typically, data is stored on magnetic hard disk drives in concentric tracks on the recording surface or surfaces of the disk or disks. Each track may be divided into a number of addressable sectors, with each sector including a preamble, sync mark, and user data.

The preamble of a disk sector may, for example, contain a pattern of bits that enables the disk read channel to calibrate its gain and allows the read channel to achieve bit synchronization. The preamble may also include a DC erase portion in which there are no logical transitions (e.g., an uninterrupted string of zeros) for a specified length. Since a string of bits with no logical transitions may be illegal everywhere else on the disk, the DC erase portion of the preamble may uniquely identify this portion as being part of the sector preamble.

The sync mark may follow the preamble on a disk sector. In addition, user data may start directly after the last bit of the sync mark. In order to read the user data, it is essential that the sync mark be reliably detected. If the sync mark is not detected, the disk read mechanism may need to re-read the same disk sector for the sync mark. If the disk read mechanism needs to re-read the disk often, the throughput of the disk read channel may suffer, causing a decrease in overall system performance.

Various factors may affect the reliability of sync mark detection in a particular disk sector. For example, as data densities and data rates increase, sources of error in magnetic data storage channels including media noise, electronics and head noise, inter-track interference, thermal asperity, partial erasure, and dropouts, become more pronounced. In addition, the read head may experience a flip in polarity. The flip in polarity may cause the data bits acquired by the read head to be flipped—e.g. a bit containing '1' would be flipped to '0', and vice versa. The polarity of the read head may not be known to the data storage system. Thus, the data storage system may not know when data readout bits acquired by the read head are flipped due to a flip in the polarity of the read head. This lack of knowledge about the polarity of the read head may present a challenge in detecting the sync mark, as the data readout bits may not represent the actual bits written on the disk when the read head is flipped in polarity.

A new sync mark detection scheme is needed to more reliably detect the sync marks of data on disk sectors. Traditional sync mark detection schemes may be inadequate, as they may not take into account the possibility of the polarity flips.

Accordingly, it is desirable to provide systems and methods for sync mark detection taking into account the polarity uncertainty of the disk read head. Further, it is desirable to provide systems and methods for sync mark detection that do not hinder the performance of data storage systems.

SUMMARY OF THE INVENTION

In accordance with the principles of this invention, systems and methods for detecting a disk sync mark are provided. In general, the systems and methods for detecting the disk sync mark detect the disk sync mark on at least one timing interval.

A window of data read bits is acquired from a data read head from a particular disk sector. The window of data read bits may comprise a fixed amount of consecutive data bits read from the disk. The window of data bits may be entirely within the preamble, sync mark, or user data of a particular disk sector, or may span the preamble and the sync mark or the sync mark and the user data. All of the data read bits in the window are directly compared to the disk sync mark to determine whether the sync mark has been detected. If the disk sync mark is detected, the bits following the detected disk sync mark may be read as user data. If the disk sync mark is not detected, a new window of data read bits may be selected by advancing the window by a fixed amount of data bits, and determining whether those bits match the disk sync mark. Thus, consecutive windows of data bits may overlap in the portion of data read bits read from the disk by the data read head. This process may be repeated until the disk sync mark is detected.

As part of the sync mark detection scheme, Hamming distances may be precalculated between the disk sync mark and shifted and/or flipped and/or partial versions of the disk sync mark, or the disk sync mark itself. These Hamming distances may be used to precalculate tolerance thresholds. The tolerance thresholds are measures of the amount of error that the sync mark detection scheme will tolerate between the disk sync mark and the readout data bits in order to declare that the disk sync mark has been detected.

Hamming distances may also be calculated between the readout data bits and an expected disk sync mark—e.g. the disk sync mark itself or a flipped disk sync mark. These Hamming distances may be compared to a tolerance threshold. The particular disk sync mark and tolerance threshold used in the comparisons may be selected based on the timing interval of sync mark detection, as well as the polarity of the read head while reading the previous disk sector. The purpose of this comparison is to determine whether the disk sync mark is present in the data read bits currently being read by the disk head in the window. The result of this comparison is reflected in a detection decision, which may be a data structure such as a collection of bits.

As mentioned, selecting the tolerance threshold to use in the comparisons may require determining the polarity of the read head while reading the previous disk sector. Since the polarity of the read head may not be known while reading a particular disk sector, the polarity may be determined once the disk sync mark has been detected. This determination may be made based on the particular disk sync mark used in the comparison in which the disk sync mark is detected, as well as the assumption that the likelihood of the polarity of the read head flipping from the previous disk sector to the current disk sector is small.

The sync mark detection scheme may be provided in the context of a hard drive storage system. The hard drive storage system may comprise any suitable magnetic hard disk drive. In addition, the hard drive storage system may be accompanied by sync mark detection circuitry. The sync mark detection circuitry may include signal processing and/or control circuitry that is configured to detect sector sync marks on the hard drive storage system.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which.

DETAILED DESCRIPTION

Figure 1:
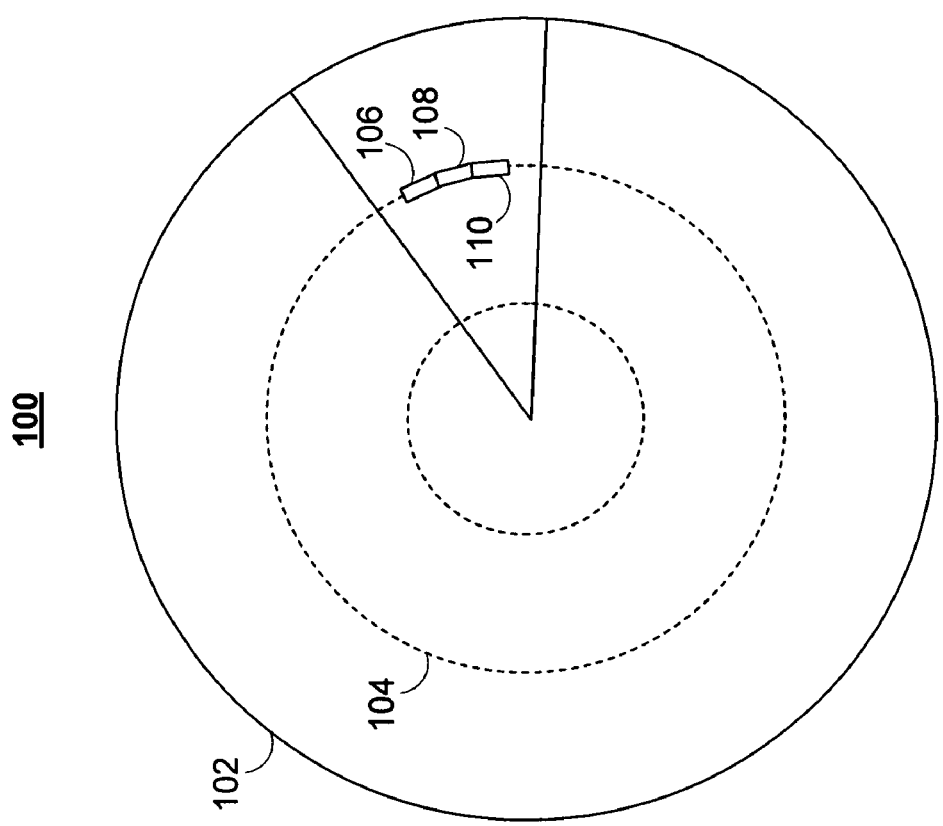
FIG. 1 is a simplified diagram of an illustrative disk platter in accordance with one embodiment of the invention.

FIG. 1 shows illustrative hard disk 100 in accordance with one embodiment of the present invention. Disk platter 102 may contain numerous concentric data tracks, such as track 104. These tracks may be divided into sectors, with each sector including sector preamble 106, sector sync mark 108, and user data 110.

Figure 2:
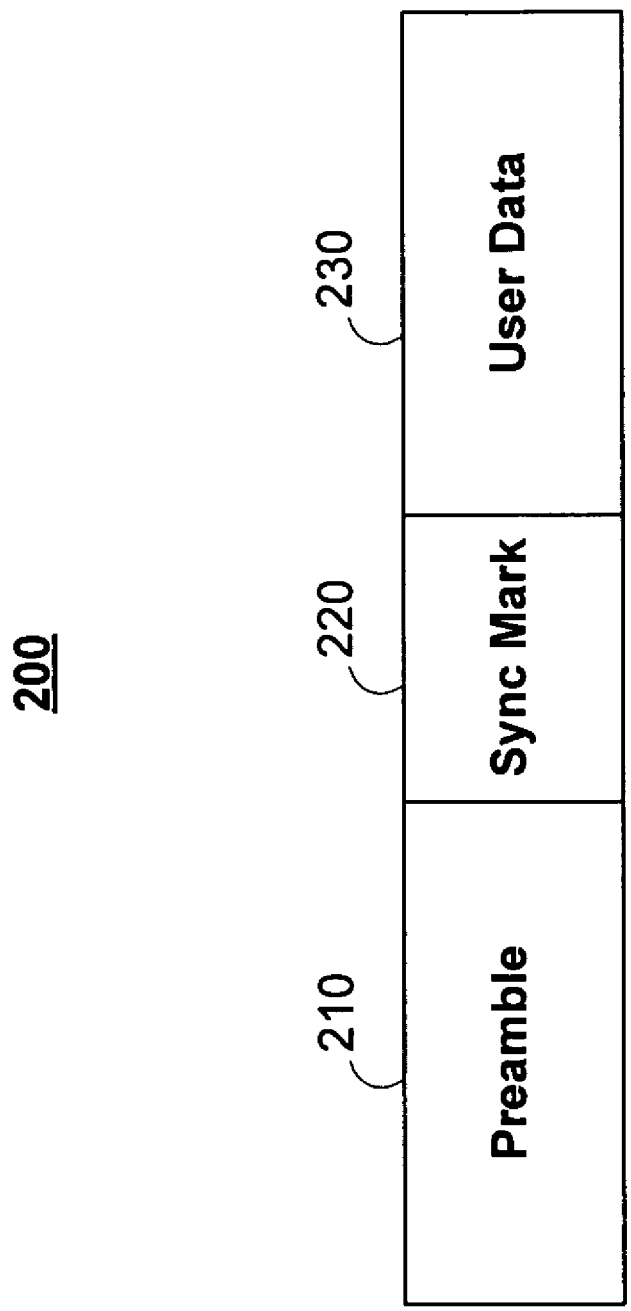
FIG. 2 is a diagram of an illustrative preamble, sync mark, and user data structure in accordance with one embodiment of the invention.

FIG. 2 shows illustrative disk sector 200 in accordance with one embodiment of the invention. Disk sector 200 may include preamble 210. Preamble 210 of disk sector 200 may, for example, contain a pattern of bits that enables the disk read channel to calibrate its gain and allows the read channel to achieve bit synchronization. Gain calibration may be achieved with automatic gain control (AGC) circuitry, and bit synchronization may be achieved with phase locked loop (PLL) circuitry (not shown). The pattern of bits may be repeated a number of times, for example 30, 35, 40, or more than 40 times. In addition, the preamble may be a 2T pattern, such as '1100', where T is one clock cycle of the disk read channel. In one example, a 1 Mbps channel rate translates into 1 1s clock cycles. Thus, a 2T pattern, such as '1100', transferred at this channel rate has a magnetic transition every 2 μs. Because logical transitions in a 2T pattern alternate from bit '1' to bit '0', or positive to negative, one complete period of the 2T pattern spans 4T. Thus, one complete repetition of a 2T pattern transferred over a 1 Mbps channel may take 4 μs. The 2T pattern may be repeated a number of times as discussed above. For example, there may be 150 repetitions of 2 μs of '1' bits followed by 2 μs of '0' bits. The preamble may also include a DC erase portion in which there are no logical transitions (e.g., an uninterrupted string of zeros) for a specified length. The preamble may end with any bit ('0' or '1'). In certain embodiments, the preamble always ends with '1100'.

After preamble 210, disk sector 200 may contain sync mark 220. Sync mark 220 may be a sequence having any suitable length of bits—for example, 5, 10, 15, 20, 15, 30, 35, or more bits. In certain embodiments, the length of sync mark 220 may be a multiple of the period of a pattern contained within preamble 210. For example, if preamble 210 has a pattern of bits that is 4T in length, then the sync mark may be 36T in length. In addition, sync mark 220 may comprise a pattern of bits.

The bit following sync mark 220 may represent the beginning of user data 230. User data 230 may be of any suitable length of bits, and may be encoded with any suitable data coding technique or combination of data coding techniques. Data coding techniques may include run-length coding, or error control coding techniques such as single parity code (SPC). In order to read user data 230, it is essential that sync mark 220 is reliably detected. If sync mark 220 is not reliably detected, the disk read mechanism may need to re-read the same disk sector for the sync mark. If the disk read mechanism needs to re-read the disk often, the throughput of the disk read channel may suffer, causing a decrease in overall system performance.

Figure 3:
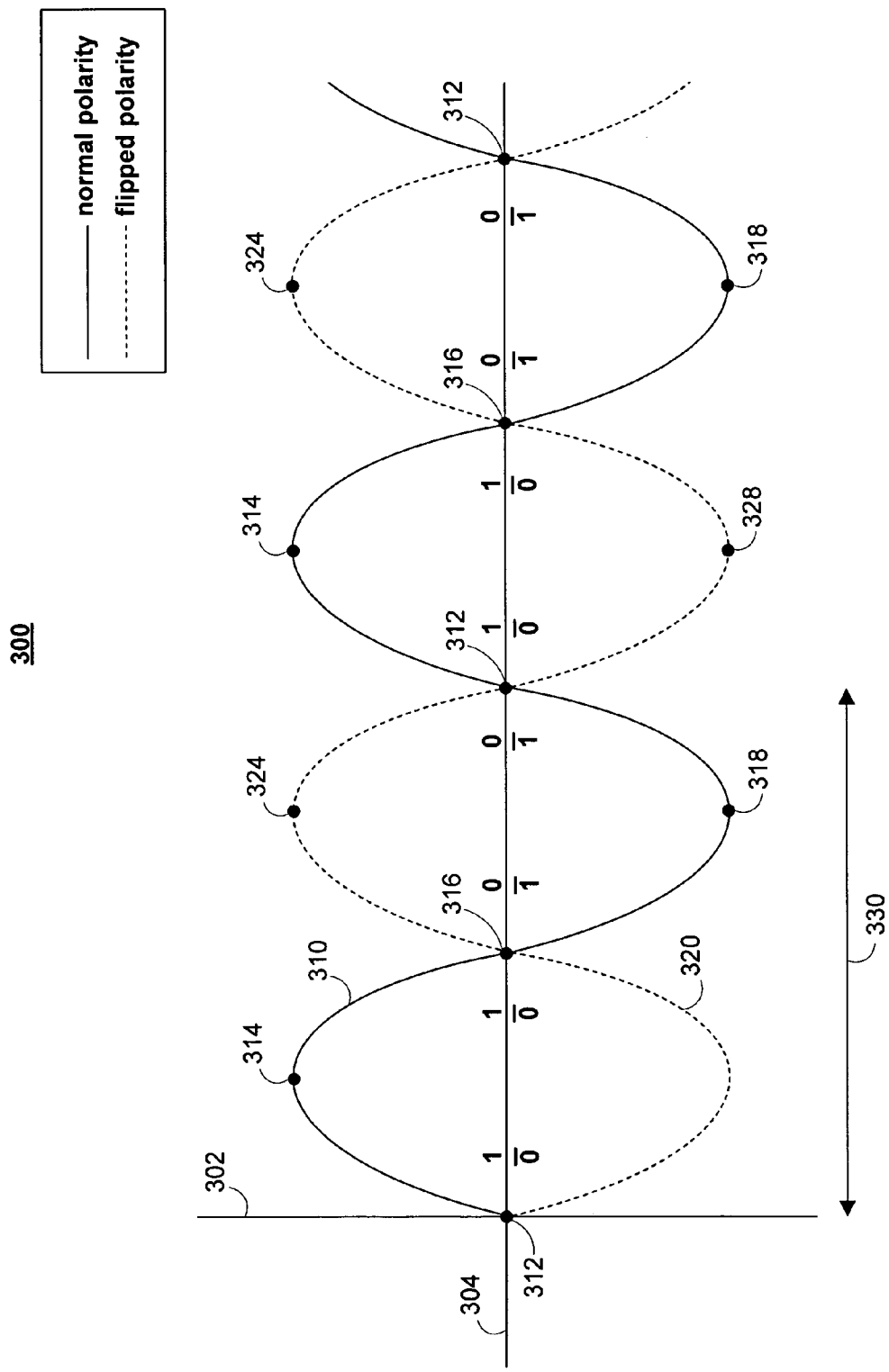
FIG. 3 shows an illustrative sinusoidal readback waveform corresponding to a sector preamble in accordance with one embodiment of the invention.

FIG. 3 shows illustrative readback graph 300 in accordance with one embodiment of the present invention. In the depicted embodiment, readback graph 300 includes amplitude axis 302 and time axis 304. In addition, readback graph 300 includes normal polarity readback waveform 310 and flipped polarity readback waveform 320. Normal polarity readback waveform 310 may be the waveform that is produced when the read head reads data for the preamble from a particular disk sector and the read head is not flipped in polarity. The preamble may be substantially similar to preamble 210 described with respect to FIG. 2. Normal polarity readback waveform 310 may represent a portion of a disk sector preamble that contains the binary sequence '1100'. The binary sequence is substantially sinusoidal with period 330. Period 330 is 4T clock cycles long. In other embodiments, the period of the normal polarity readback waveform 310 may be larger or smaller than 4T. In addition, the data that normal polarity readback waveform 310 represents may be ternary, quaternary, or any other suitable type of data.

Normal polarity readback waveform 310 may include several phase transitions. The phase transitions may be zero crossings or peaks on the normal polarity readback waveform 310. For example, zero phase markers 312 may occur when the normal polarity readback waveform 310 transitions from '0' to '1' at the start of the binary sequence in the preamble of the disk sector. First phase markers 314 may occur when the normal polarity readback waveform 310 peaks in positive amplitude. Second phase polarity markers 316 may occur when the normal polarity readback waveform 310 transitions from '1' to '0'. Third phase polarity markers 312 may occur when the normal polarity readback waveform 310 peaks in negative amplitude.

As mentioned, the sync mark may appear on the disk sector directly after the preamble. The sync mark may be substantially similar to sync mark 220 described with respect to FIG. 2. Thus, normal polarity readback waveform 310 must be periodically checked in order to detect the sync mark. The checking may include comparing the bits of the normal polarity readback waveform to the bits of the sync mark. If it is known that the period 330 of a pattern in the portion of the preamble is the same as a pattern in the portion of the period of the sync mark, waveform 310 may be checked once every period rather than once every phase or clock cycle.

In certain embodiments, the phase of the ending bit of the preamble and the sync mark length may be known or the phase of the ending bit of the sync mark relative to the preamble may be known. This information allows the data storage system to know at what phase of normal polarity readback waveform 310 to check normal polarity readback waveform 310. For example, the length of the preamble may be 134 bits. Thus, the data storage system may check normal polarity readback waveform 310 at each second phase marker 316 in order to detect the sync mark.

During operation, the read head of the data storage medium may experience a flip in polarity. This flip in polarity may cause the binary bits of data in the readout waveform to be flipped—e.g. a bit containing '1' will be flipped to '0', and vice versa. The information regarding the current polarity of the read head may not be known to the data storage system, and thus the polarity flip may pose an additional challenge to detecting the sync mark.

Flipped polarity readback waveform 320 illustrates normal polarity readback waveform 310 under the effects of a polarity flip by the read head. However, a portion of data in the normal polarity readback waveform 310 may not be lost, as flipped polarity readback waveform 320 may be a partial copy of normal polarity readback waveform 310 shifted a particular number of clock cycles later in time. For example, if a portion of the preamble and/or the sync mark that comprises normal polarity readback waveform 310 contains a bit pattern, then flipped polarity readback waveform 320 may be partially similar to waveform 310, except shifted 2 clock cycles later in time. Third phase markers 316 for normal polarity readback waveform 310 may be similar to the zero phase markers for flipped polarity readback waveform 320. In addition, first phase markers 324 for flipped polarity readback waveform 310 may be similar to first phase markers 314 for normal polarity readback waveform 310. Also, zero phase markers 312 for normal polarity readback waveform 310 may be similar to the second phase polarity markers for flipped polarity readback waveform 320. Finally, third phase markers 318 for flipped polarity readback waveform 320 are substantially similar to third phase markers 328 for normal polarity readback waveform 310.

The sync mark of flipped polarity readback waveform 320 may be different than the actual sync mark shifted 2 clock cycles later in time. Thus, if the flipped polarity readback waveform 320 is checked every four clock cycles for the sync mark as the normal polarity readback waveform 310 was before, the sync mark may not be detected. However, if the flipped polarity readback waveform 320 is checked every two clock cycles for the sync mark, the sync mark may be detected. In certain embodiments, the sync mark may be chosen to have a maximum hamming distance from flipped and/or shifted versions of the sync mark.

Figure 4:
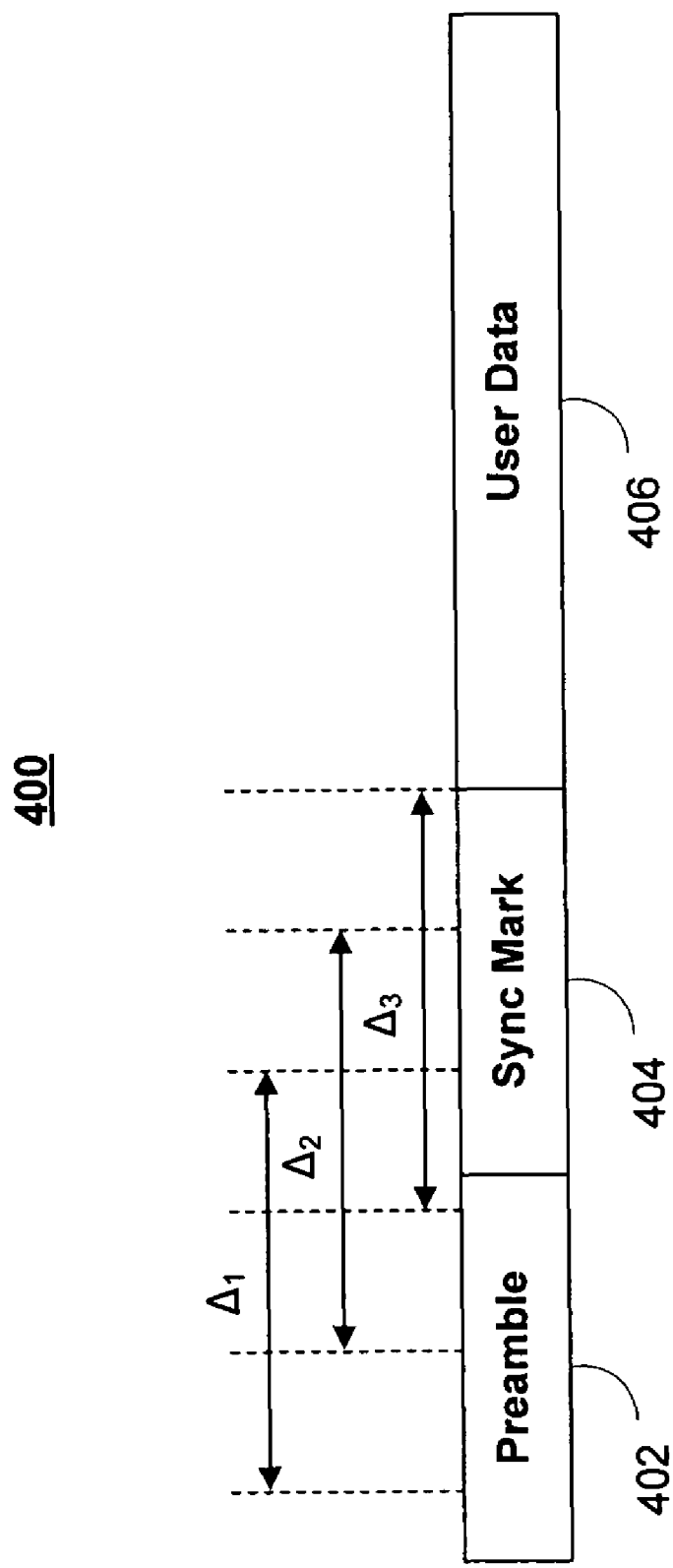
FIG. 4 shows illustrative sector data in accordance with one embodiment of the invention.

FIG. 4 shows illustrative sector data 400. Sector data 400 may include preamble portion 402, sync mark portion 404, and user data portion 406. In addition, FIG. 4 shows a plurality of read windows including data read bits. A read window of data read bits may comprise a fixed amount of consecutive data bits read from the disk. The window of data bits may be entirely within the preamble, sync mark, or user data of a particular disk sector, or may span the preamble and the sync mark or the sync mark and the user data. If the sync mark has not been detected in a particular read window, a new window of data read bits may be selected by advancing the window by a fixed amount of data bits. Thus, consecutive windows of data bits may overlap in the portion of data read bits read from the disk by the read head. This process may be repeated until the sync mark is detected. As explained with respect to FIG. 3, a version of the sync mark may be expected to appear every half preamble period. Thus, the sync mark detection may be performed every half preamble period (e.g. 2T in the embodiment illustrated in FIG. 2). For example, one sync mark detection decision may be based on read window $\Delta_1$. Read window $\Delta_1$ may coincide with a phase transition in the readback data as described with respect to FIG. 3. The next detection decision may occur two clock cycles later at read window $\Delta_2$, and another detection decision may coincide two clock cycles later at read window $\Delta_3$. As mentioned, the read window may be advanced after each detection decision until the sync mark is detected. As can be seen from the example of FIG. 4, eventually the correlation detection read window will encompass the actual sync mark.

As the read window advances, various versions of the sync mark pattern, referred to herein as S, may be observed by the read head. The following versions of S may be expected when the sync mark contains a bit pattern that is 4T long—i.e. the pattern '1100' in the embodiment illustrated with respect to FIG. 2: The sync mark itself, S, may be observed. The flipped version of S, referred to herein as ~S, may be observed. The 4T right-shifted version of S, referred to herein as $S_i$, may be observed. The flipped version of $S_i$, referred to herein as ~$S_i$, may be observed. The 2T right shifted version of $S_i$, referred to herein as $S_{i\_2}$, may be observed. The 2T right shifted version of ~$S_i$, referred to herein as $S_{i\_2}$, may be observed. The detection algorithm must be able to distinguish the sync mark pattern from these possible observed versions of the sync mark pattern in order to read the user data 406 successfully.

It is possible that the various versions of S may be observed at different phases of the readback waveform produced by the read head. As mentioned, the sync mark detection may be performed every half preamble period. The sync mark detection at every full preamble period (i.e. every even half preamble period) may be associated with a normal phase—i.e. the zero phase described with respect to FIG. 3. At the normal phase, the sync mark detection may expect to observe S. However, due to the period of a pattern in the preamble, a shifted and/or flipped and/or partial version of S may be expected. For example, when the preamble contains a bit pattern that is 4T long—i.e. the pattern '1100' in the embodiment illustrated with respect to FIG. 3, $S_i$ or ~$S_{i\_2}$ may be observed. $S_i$ may be observed as it is simply a 4T right shifted version shifted version of S. ~$S_{i\_2}$ may be observed as it is a 2T right shifted version of a 4T right shifted version of S that has been flipped. As described with respect to FIG. 3, the flipped version of S may be partially similar to S, except right shifted 2T in time.

In addition, the sync mark detection at every half preamble period (i.e. every odd half preamble period) may be associated with an opposite phase—i.e. a second phase shifted 180 degrees described with respect to FIG. 3. At the second phase, the sync mark detection may expect to observe ~S. However, due to the period of a pattern in the preamble, shifted and/or flipped and/or partial versions of S may be expected. For example, when the preamble contains a bit pattern that is 4T long—i.e. the pattern '1100' in the embodiment illustrated with respect to FIG. 3, ~$S_i$ or $S_{i\_2}$ may be observed. ~$S_i$ may be observed as the flipped version of S right shifted 4T in time may be partially similar to ~S. $S_{i\_2}$ may be observed as it is the 2T right shifted version of a 4T right shifted version of S. As described with respect to FIG. 2, the 2T right shifted version of S may be partially similar to ~S.

Figure 5:
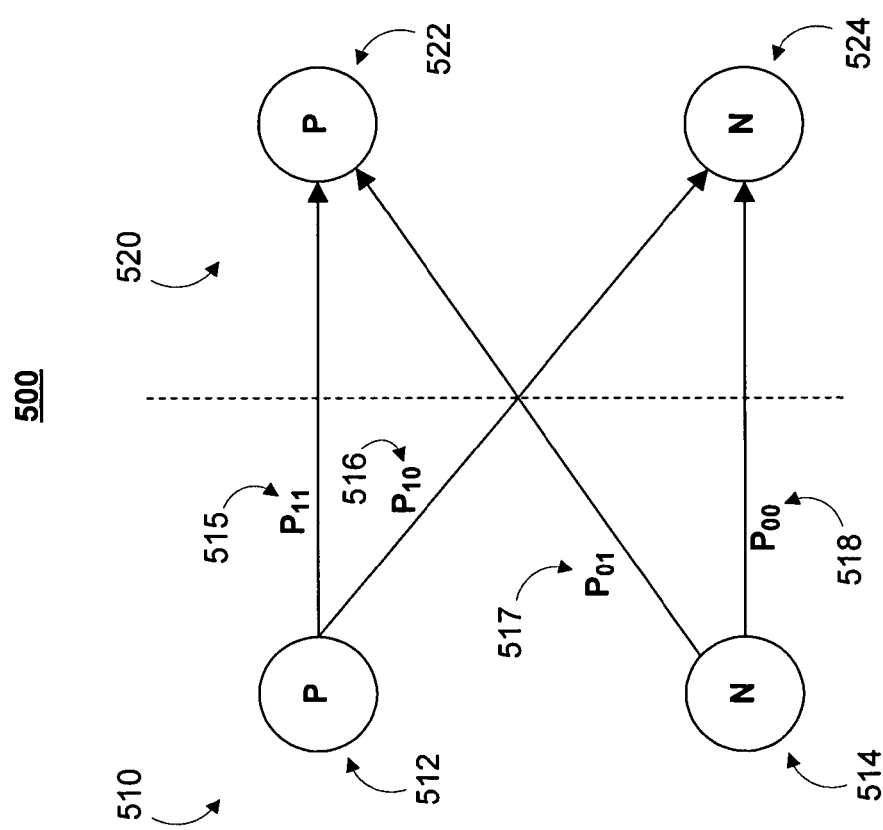
FIG. 5 shows an illustrative block diagram of the probabilities associated with transitions in polarity from one disk sector to another disk sector.

FIG. 5 shows an illustrative block diagram of probabilities associated with polarity transitions from the previous disk sector to the current disk sector. Left nodes 510 represent the polarity of the read head at a previous disk sector, while right nodes 520 represent the polarity of the read head at a current disk sector. Nodes 512 and 522 represent states where the read head is positive, or normal, in polarity, while nodes 514 and 524 represent states where the read head is negative, or opposite, in polarity. Transition probability P11 515 represents the probability that the read head will remain positive from the previous disk sector to the current disk sector. Transition probability P10 516 represents the probability that the read head will change from positive to negative in polarity from the previous disk sector to the current disk sector. Transition probability P01 517 represents the probability that the read head will change from negative to positive in polarity from one disk sector to the next. Finally, transition probability P00 518 represents the probability that the read head will remain negative from one disk sector to the next.

The data storage system may use these transition probabilities as "pre-knowledge" in a sync mark detection scheme. In certain embodiments, a flip in the polarity of the read head is a rare occurrence. For example, transition probabilities P11 and P00 may be approximately equal to one—e.g. between 0.99 and 1.0, while probabilities P10 and P01 may be much less than 1.0. For example, transition probabilities P10 and P01 may be $1 \times 10^{-5}$, $1 \times 10^{-6}$, $1 \times 10^{-7}$, or smaller. Further, in these embodiments it may be assumed that P11 is equal to P00, and P10 is equal to P01. With the pre-knowledge that a flip in the polarity of the read head is a rare occurrence it may be possible to tailor the sync mark detection scheme so that the sync mark is detected more reliably, as will be detailed below.

Figure 6A:
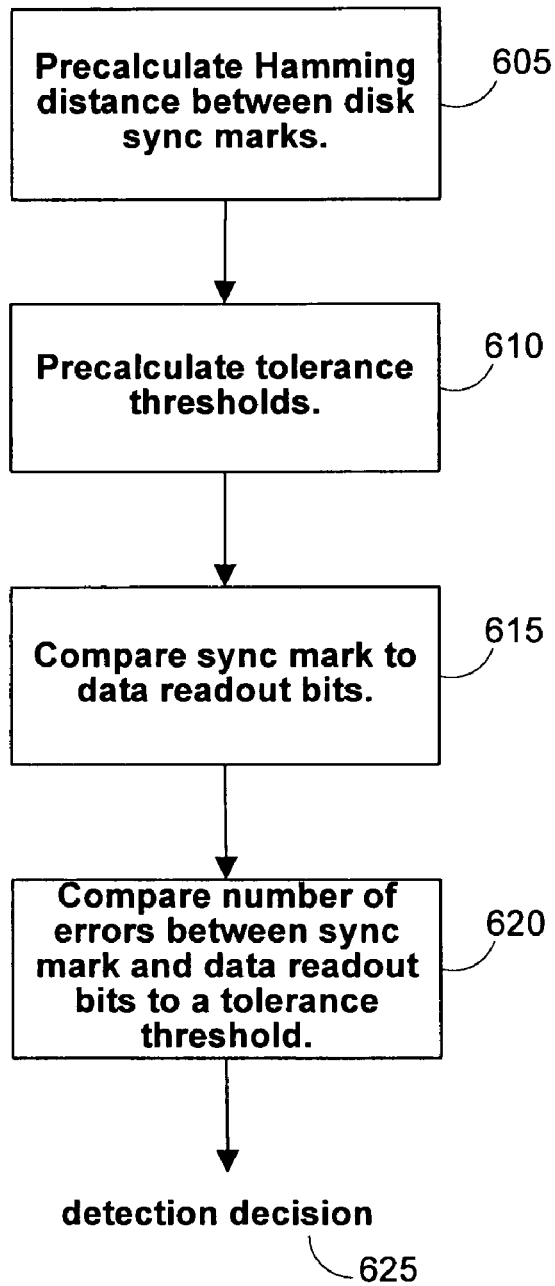
FIG. 6A shows an illustrative flow chart of a process for detecting the sync mark in a particular disk sector of a data storage system when the polarity of the read head is uncertain.

FIG. 6A shows an illustrative flow chart of a process 600A for detecting a sync mark in a disk sector of a data storage system when the polarity of the read head is uncertain. Steps 605 and 610 of process 600A may be performed once as part of a set of precalculations for the sync mark detection. Steps 615 and 620 of process 600A may be performed every preamble period or every half preamble period as discussed with respect to FIG. 3. The length of the preamble period may vary according to the particular pattern in a portion of the preamble data and/or the sync mark. In addition, steps 615 and 620 of process 600A may be performed in conjunction with one read window as described with respect to FIG. 4.

At step 605, Hamming distances may be precalculated. The Hamming distances calculated may be between the sync mark and shifted and/or flipped versions of the sync mark. The sync mark S may be of any suitable length and of any particular pattern. In one embodiment, the sync mark S may be defined as:

$$S=[0011000000111111000000111111111100] \quad \text{(EQ. 1)}$$

By definition, the flipped version of this particular sync mark S may be defined as:

$$\sim S=[1100111110000001111110000000000011] \quad \text{(EQ. 2)}$$

Shifted and/or flipped versions of the sync mark may include versions of the sync mark discussed with respect to FIG. 4—i.e. S, ~S, $S_i$, $S_{i\_2}$, ~$S_i$, $S_{i\_2}$. These precalculations may be used to calculate tolerance thresholds. The tolerance thresholds may be used to determine whether the readout data bits are close enough to the sync mark to declare that the sync mark has been detected.

At step 610, tolerance thresholds are precalculated. As mentioned, the tolerance thresholds are measures of the amount of error that the sync mark detection scheme will tolerate between the sync mark and the readout data bits in order to declare that the sync mark has been detected. In certain embodiments, two tolerance thresholds may be calculated. A first tolerance threshold may be associated with a first detection phase, while a second tolerance threshold may be associated with a second detection phase. The detection phases may be similar to those described with respect to FIGS. 2 and 4. These tolerance thresholds may then be used in step 620 in order to determine whether the sync mark is detected.

At step 615, a sync mark is compared to the data readout bits. In certain embodiments, the Hamming distance between a sync mark and the readout data bits is calculated—that is, the number of errors between a sync mark and the data readout bits is computed. The sync mark that is compared to the data readout bits may be selected based on the particular detection phase that step 615 is executed on during sync mark detection. For example, on certain detection phases the sync mark that is compared to the data readout bits is the nominal, or non-flipped, version of the sync mark. On other detection phases, the sync mark that is compared to the data readout bits is the flipped version of the sync mark. The readout data bits may be the data in the current read window as described with respect to FIG. 4.

At step 620, the number of errors between a sync mark and the readout data bits is compared to a tolerance threshold. The purpose of this comparison is to determine whether the sync mark is present in the data readout bits currently being read by the read head. The tolerance threshold that is used in the comparison may be selected based on the particular detection phase that step 620 is executed on during sync mark detection. In addition, the tolerance threshold that is used in the comparison may be selected based on whether the polarity of the read head while reading the previous disk sector was positive or negative. In certain embodiments, polarity of the read head while reading the previous disk sector may not be absolutely known during sync mark detection. Thus, in these embodiments the polarity of the read head may be determined during sync mark detection for every disk sector based on the detection phase in which the sync mark is detected.

The result of the sync mark detection may be reflected by detection decision 625. Detection decision 625 may be a bit, a collection of bits, or any other suitable data structure that expresses the result of the comparison in step 620. In certain embodiments, detection decision 625 may include the polarity of the read head while reading the current disk sector. The polarity may be determined based on the detection phase in which the sync mark was detected. In certain embodiments, the polarity of the read head while reading the current disk sector may be made available during sync mark detection of subsequent disk sectors.

Figure 6B:
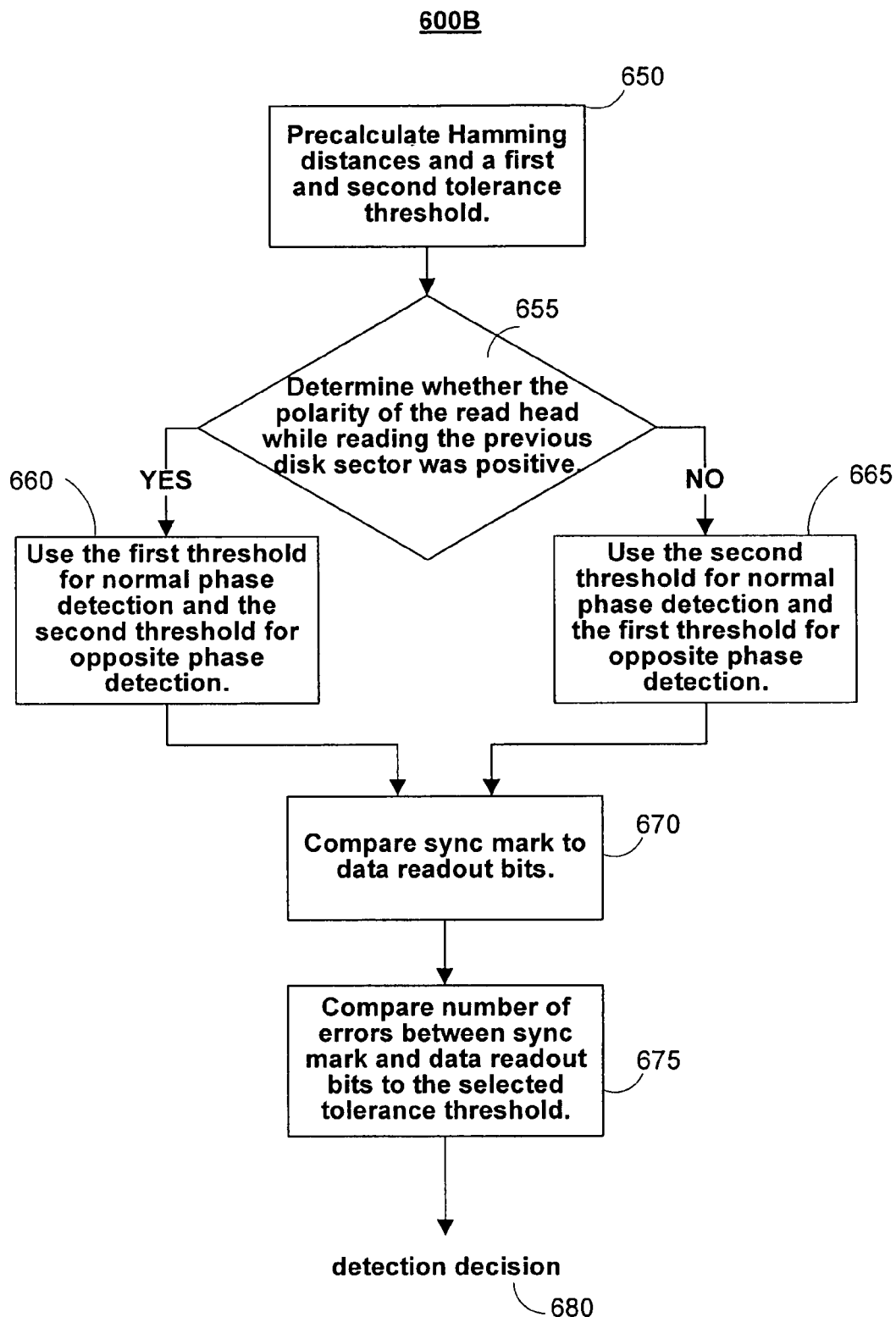
FIG. 6B shows another illustrative flow chart of a process for detecting the sync mark in a particular disk sector of a data storage system when the polarity of the read head is uncertain.

FIG. 6B shows an illustrative flow chart of a more detailed process 600B for detecting a sync mark in a disk sector of a data storage system when the polarity of the read head is uncertain. Process 600B may be performed every preamble period, every half preamble period, or any suitable phase as discussed with respect to FIG. 3. The length of the preamble period may vary according to the particular pattern in a portion of the preamble data and/or the sync mark. In addition, process 600B may be performed in conjunction with one read window as described with respect to FIG. 4.

At step 650, Hamming distances and tolerance thresholds may be precalculated. The Hamming distances may be calculated similarly to those described in step 605 of FIG. 6A. The specific Hamming distances calculated may depend on the shifted and/or flipped versions of the sync mark—for example, the Hamming distance may be calculated between corresponding pairs of sync marks discussed with respect to FIG. 4—for example, S and $S_i$, S and $\sim S_{i\_2}$, $\sim S$ and $\sim S_i$, and/or $\sim S$ and $S_{i\_2}$. The Hamming distance may be calculated as the number of positions between two equal length strings of bits, in this case sync marks, in which the strings of bits differ. In certain embodiments, the Hamming distances may be calculated as the minimum Hamming distance—in other words, the minimum amount of positions in which the strings of bits can differ.

In some embodiments, a set of Hamming distances may be calculated for when sync mark detection is performed on a normal phase—e.g. a zero phase marker as described with respect to FIG. 3. The minimum Hamming distance may be calculated between S and $S_i$ as well as S and $\sim S_{i\_2}$. The minimum Hamming distance between S and $S_i$ may be known as d0, and the minimum Hamming distance between S and $\sim S_{i\_2}$ may be known as d1. When S is defined according to EQ. 1, d0 is 22, while d1 is 16.

In some embodiments, a set of Hamming distances may be calculated for when sync mark detection is performed on an opposite phase—e.g. a second phase marker as described with respect to FIG. 3. The minimum Hamming distance may be calculated between $\sim S$ and $\sim S_i$, as well as $\sim S$ and $S_{i\_2}$. The minimum Hamming distance between $\sim S$ and $\sim S_i$ may be known as d0, and the minimum Hamming distance between $\sim S$ and $S_{i\_2}$ may be known as d1. When $\sim S$ is defined according to EQ. 2, d0 is 22, while d1 is 16.

The tolerance thresholds may be calculated similarly to those described in step 610 of FIG. 6A. In certain embodiments two tolerance thresholds may be calculated—A first known as t0 that is associated with a first detection phase, and a second known as t1 associated with a second detection phase. These calculations may be based on the precalculated Hamming distances described above. The first detection phase may be a normal phase—e.g. a zero phase marker as described with respect to FIG. 3, and the second detection phase may be an opposite phase—e.g. a second phase marker as described with respect to FIG. 3. Alternatively, these definitions of a first phase and a second phase may be flipped. The first tolerance threshold may be calculated as:

$$t0 = \left\lfloor \frac{d0-1}{2} \right\rfloor, \tag{EQ. 3}$$

where $\lfloor x \rfloor$ denotes the largest number less than or equal to x. In certain embodiments, the first tolerance threshold may be calculated to be half of the minimum Hamming distance between S and any $S_i$. Such values achieve a balance between error tolerance and distinguishing between $S_i$ and S. In certain embodiments, t0 may be calculated to be larger than $$\left\lfloor \frac{d0-1}{2} \right\rfloor$$

to decrease the probability of not detecting the sync mark. In certain embodiments, t0 may be calculated to be smaller than $$\left\lfloor \frac{d0-1}{2} \right\rfloor$$

to decrease the probability of not distinguishing between S and $S_i$. The second tolerance threshold may be calculated as:

$$t2 = d1 - t0 \tag{EQ. 4}$$

When S is defined according to EQ. 1, t0 may be calculated as 10 and t1 may be calculated as 6.

The precalculation of Hamming distances and tolerance thresholds may be performed once for a particular disk sector, a group of disk sectors, all of the disk sectors on a particular disk, or any suitable group of information on the disk on which sync mark detection is being performed.

At step 655 it is determined whether the polarity of the read head while reading the previous disk sector was positive. This determination is performed in order to select which one of the precalculated tolerance thresholds will be used during each phase of sync mark detection. Step 665 may be one of the sub-steps of step 610 in FIG. 6A. In certain embodiments, the polarity of the read head cannot be determined. Thus, the polarity of the read head while reading the previous disk sector may be determined from the results of the sync mark detection in the previous disk sector. For example, if the sync mark S was matched in the previous disk sector, it may be estimated that the polarity of the read head while reading the previous disk sector was positive. Conversely, if the flipped sync mark $\sim S$ was matched in the previous disk sector, it may be estimated that the polarity of the read head while reading the previous disk sector was negative. As discussed with respect to FIG. 5, it may be known that the polarity of the read head changes from one sector to the next infrequently—for example, one in million disk sector transitions. Thus, the data storage system may assume that the polarity of the read head while reading the current data sector is the same as the polarity of the read head while reading the previous data sector. In addition, if the disk sector is the first that is examined on the disk for a sync mark, the data storage system may assume that the polarity of the read head is positive.

If the polarity of the read head in the previous disk sector is determined to be positive, the sync mark detection scheme executes step 660. Step 660 may be one of the sub-steps of step 610 in FIG. 6A. At step 660, the first threshold calculated in step 650 may be designated for use during a normal phase of sync mark detection—e.g. a zero phase marker as described with respect to FIG. 3. In addition, the second threshold calculated in step 650 may be designated for use during an opposite phase of sync mark detection—e.g. a second phase marker as described with respect to FIG. 3. In one example, the threshold which is used during normal phases of sync mark detection is larger than the threshold which is used during opposite phases of sync mark detection. The thresholds are selected in this manner in this example because the data storage system typically expects to be matching S rather than $\sim S$, and can tolerate more errors in matching S rather than $\sim S$.

If the polarity of the read head in the previous disk sector is determined to be negative the sync mark detection scheme executes step 665. Step 665 may be one of the sub-steps of step 610 in FIG. 6A. At step 665, the second threshold calculated in step 650 may be designated for use during a normal phase of sync mark detection, while the first threshold calculated in step 650 may be designated for use during an opposite phase of sync mark detection. Note that this designation essentially flips the use of t0 and t1. The thresholds are selected in this manner because the data storage system typically expects to be matching ~S rather than S, and can tolerate more errors in matching ~S rather than S.

At step 670, the sync mark is compared to the data readout bits. In particular, the Hamming distance between the sync mark and the data readout bits is calculated. Step 670 may be substantially similar in structure and intent as step 615 in FIG. 6A. The sync mark used in the comparison may be selected based on the particular phase that process 600B is executed on, as described in step 615 in FIG. 6A. For example, S may be selected to be used in the comparison when the sync mark is being detected on a normal phase, and ~S may be selected to be used in the comparison when the sync mark is being detected on an opposite phase. The readout data bits may be the data in the current read window as described with respect to FIG. 4.

At step 675, the Hamming distance calculated at step 670 may be compared to the selected tolerance threshold. Step 675 may be substantially similar in structure and intent as step 620 in FIG. 6A. The tolerance threshold may be the tolerance threshold selected at steps 660 or 665—i.e. the tolerance threshold may depend upon the determination of whether the polarity of the previous disk sector was positive, and what phase of sync mark detection the data storage system is currently in. Step 675 may produce detection decision 680. Detection decision 680 may be substantially similar to detection decision 625 in FIG. 6A. Detection decision 680 may be a collection of bits, or any other suitable data structure that expresses the result of the comparison in step 675, as described with respect to step 620 in FIG. 6A. In one embodiment, at step 680 the Hamming distance calculated at step 670 is compared to the tolerance threshold to see whether the Hamming distance is less than or equal to the tolerance threshold. If the Hamming distance is less than or equal to the tolerance threshold, then the data storage system may determine that the sync mark has been found. Thus, the detection decision may be equal to the single bit '1', indicating that the sync mark has been detected. With the sync mark detected, the read head may interpret the bits following the current read window as user data. Conversely, if the Hamming distance is greater than the tolerance threshold, then the data storage system may determine that the sync mark has not been found. Thus, the detection decision may be equal to the single bit '0', indicating that the sync mark has not been detected. The read head may then advance the read window in an effort to further search for the sync mark. In addition, detection decision 680 may include the polarity of the read head while reading the current disk sector as discussed with respect to detection decision 680 in FIG. 600B.

In practice, one or more steps shown in illustrative process 600B may be combined with other steps, performed in any suitable order, performed in parallel (e.g., simultaneously or substantially simultaneously) or removed.

The tolerance thresholds selected in steps 660 and 665 may be selected according to several assumptions about the probabilities associated with a flip in polarity from the previous disk sector to the current disk sector. For example, it may be assumed that the probability for error in detecting the sync mark is very small, and thus the tolerance threshold for detecting ~S when the previous polarity of the read head was positive should be smaller than the tolerance threshold for detecting S. Similarly, it may be assumed that the probability for error in detecting the sync mark is very small, and thus the tolerance threshold for detecting S when the previous polarity of the read head was negative should be smaller than the tolerance threshold for detecting ~S. A small probability typically refers to one that is equal to or smaller than $1 \times 10^{-6}$. The probability that the sync mark will be detected in error may be defined as:

$$prob(e) = pa * prob(e \mid A) + pb * prob(e \mid B) \quad \text{(EQ. 7)}$$
$$= pa * [prob(e \mid A, \text{ phase0}) + prob(e \mid A, \text{ phase2})]$$
$$+ pb * [prob(e \mid B, \text{ phase0}) + prob(e \mid B, \text{ phase2})]$$

where pa is the probability that the polarity of the read head will remain constant from one disk sector to the next, pb is the probability that the polarity of the read head will flip from one disk sector to the next, e is the event that the sync mark is detected in error, A is the event that the polarity remains constant from one disk sector to the next, B is the event that the polarity of the read head flips from one disk sector to the next, phase0 is the event that the sync mark is being checked on a normal phase boundary, and phase2 is the event that the sync mark is being checked on an opposite phase boundary.

It may be further assumed that prob(e|A, phase0) is small, as the probability that the Hamming distance calculated at step 650 will exceed the tolerance threshold when the sync mark is present on a normal phase boundary is very small. Similarly, it may be assumed that prob(e|A, phase2) is small, as the probability that the Hamming distance calculated at step 650 will not exceed the tolerance threshold when the sync mark is not present on an opposite phase boundary is small. Thus, the first term in EQ 7 may be small.

It may be further assumed that prob(e|B, phase0) is large, as the probability that the Hamming distance calculated at step 650 will exceed the tolerance threshold when the sync mark is present on a normal phase boundary, and the polarity has changed from the last disk sector, is large. Similarly, it may be assumed that prob(e|B, phase2) is large, as the probability that the Hamming distance calculated at step 650 will not exceed the tolerance threshold when the sync mark is not present, and the polarity has changed from the last disk sector, is large. However, pb is very small, as discussed with respect to FIG. 5. Thus, the second term in EQ. 7 is small as well. Thus, both terms in EQ. 7 may be assumed to be small, and prob(e) may be assumed to be small.

Figure 7:
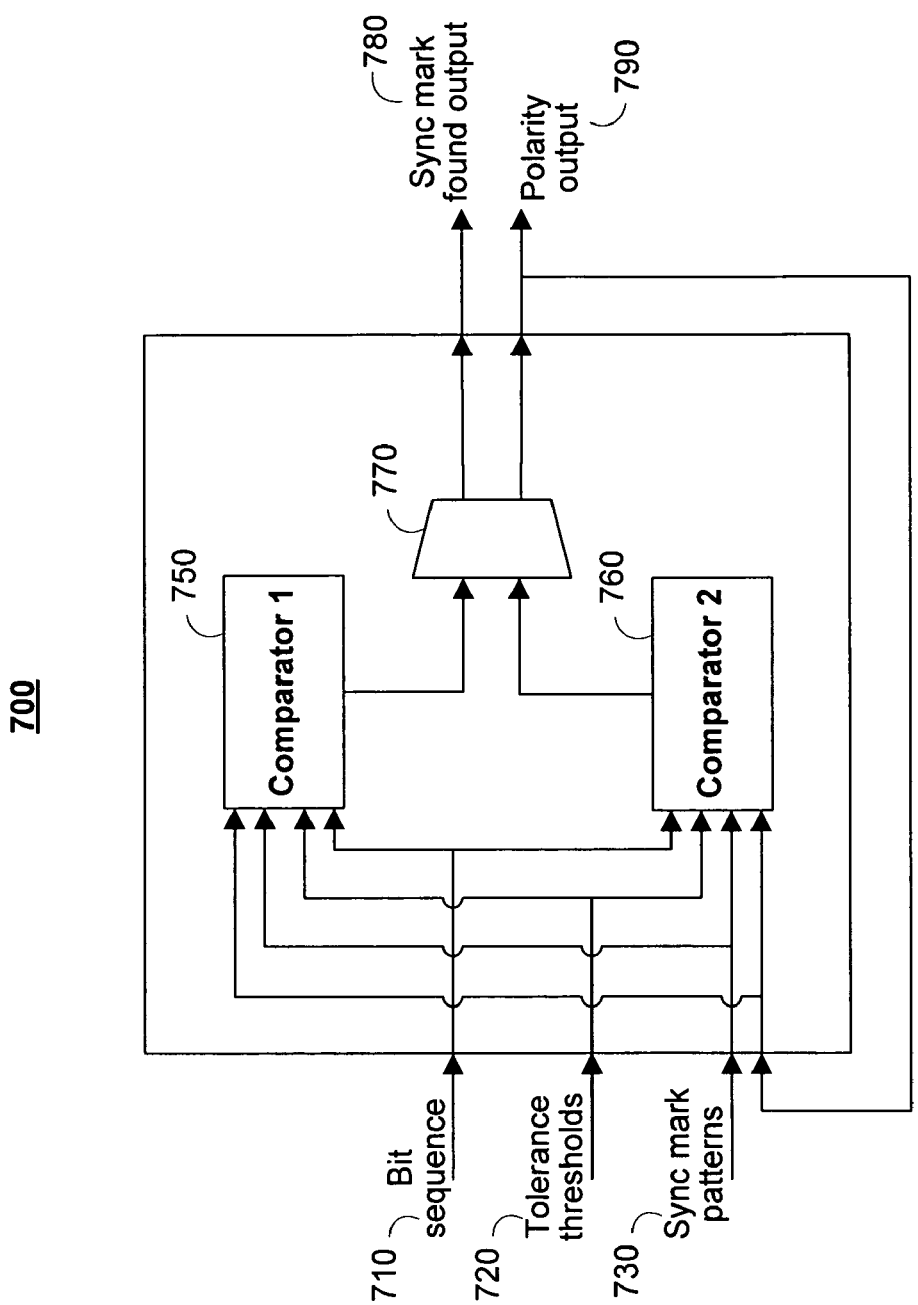
FIG. 7 shows an illustrative block diagram of sync mark detection circuitry in accordance with one embodiment of the invention.

FIG. 7 shows an illustrative block diagram of sync mark detection circuitry 700 that implements the disclosed sync mark detection scheme. Sync mark detection circuitry 700 takes bit sequence 710, tolerance thresholds 720, sync mark patterns 730, and polarity output 790 as input. Bit sequence 710 may include the data bits acquired by the read head of the disk drive mechanism. Tolerance thresholds 720 may include a set of tolerance thresholds similar to those calculated in step 650 of process 600B in FIG. 6B. In some embodiments, tolerance thresholds 720 may include a first tolerance threshold and a second tolerance threshold. Sync mark patterns 730 may include a nominal version of the sync mark and a flipped version of the sync mark. Polarity output 790 may include the polarity of the disk sector whose sync mark was recently detected by sync mark detection circuitry 700. In some embodiments, polarity output 790 may be delayed by delay circuitry such as a buffer in order to facilitate the timing of sync mark detection circuitry 700.

Each input of sync mark detection circuitry 700 may be passed to a first comparator 750 and a second comparator 760. First comparator 750 and second comparator 760 may be used to compare the number of differences between the sync mark patterns 730 and the bit sequence 710 with a tolerance threshold of the tolerance thresholds 720. In some embodiments, the first comparator exclusively uses the nominal version of the sync mark in this comparison, while the second comparator exclusively uses the flipped version of the sync mark. In addition, the tolerance thresholds used by each comparator may vary based on the polarity of the read head while reading the previous disk sector. This information may be acquired from polarity output 790. For example, if polarity output 790 indicates that the polarity of the previous disk sector was positive, the first tolerance threshold may be used by the first comparator while the second tolerance threshold may be used by the second comparator. Conversely, if the polarity output 790 indicates that the polarity of the previous disk sector was negative, the second tolerance threshold may be used by the first comparator while the first tolerance threshold may be used by the second comparator.

Further, each of the comparators may alternate in operation according to the current phase of sync mark detection. For example, if sync mark detection circuitry 700 is operating on a normal phase, the first comparator may be activated for sync mark detection. Conversely, if sync mark detection circuitry 700 is operating on an opposite phase, the second comparator may be activated for sync mark detection. When a particular comparator is activated, the comparator may compute the Hamming distance between the sync mark pattern used by the comparator and the bit sequence 710. This Hamming distance may be compared to the selected tolerance threshold of tolerance thresholds 720. The comparison may produce an output signal. Each comparator's output signal may be passed to logic block 770. Logic block 770 may multiplex the incoming signals to produce an appropriate sync mark found output 780 and polarity output 790. The sync mark found output 780 may indicate that the sync mark was found during the current execution cycle of sync mark detection circuitry 700. Polarity output 790 may be determined based on the phase of sync mark detection in which the sync mark was detected. For example, if the sync mark was detected on a normal phase, polarity output 790 may indicate that the polarity of the disk read head is positive. Conversely, if the sync mark was detected on an opposite phase, polarity output 790 may indicate that the polarity of the disk read head is negative.

Referring now to FIGS. 8A-8G, various exemplary implementations of the present invention are shown.

Figure 8A:
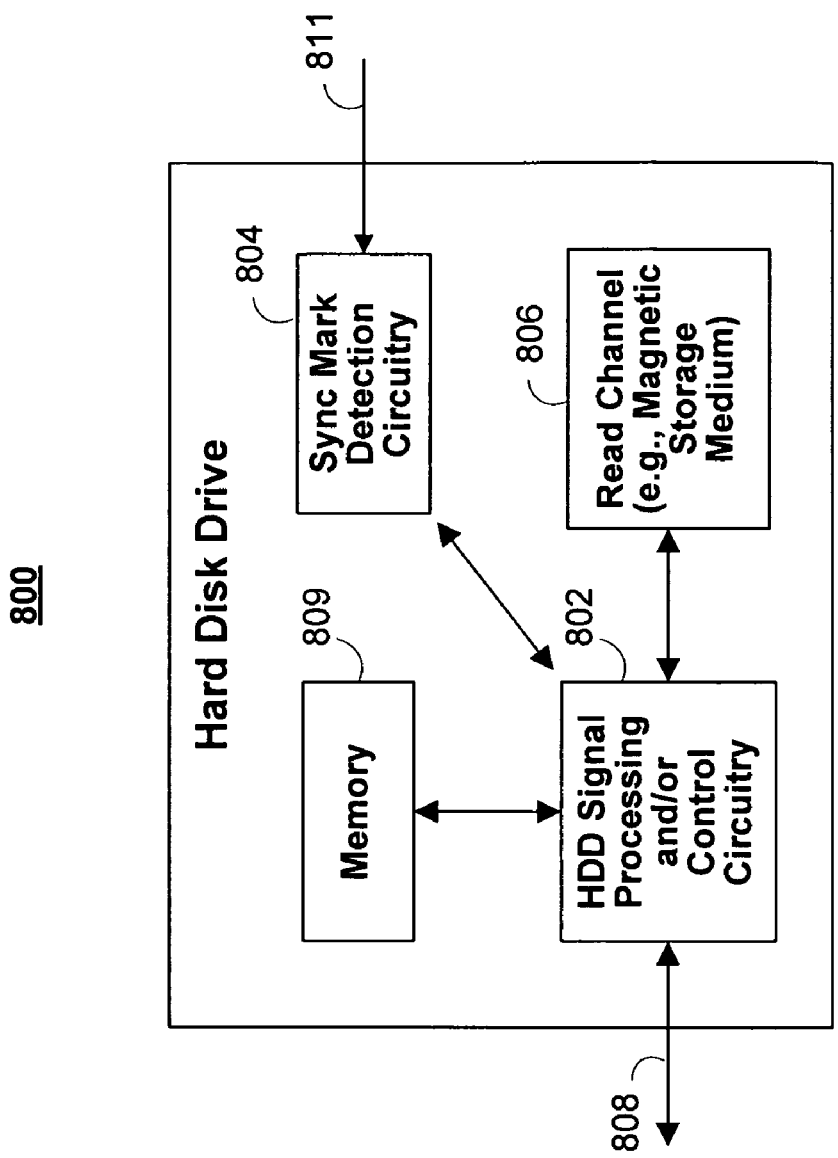
FIG. 8A is a block diagram of an exemplary hard disk drive that can employ the disclosed technology.

Referring now to FIG. 8A, the present invention may be implemented in hard disk drive 800 or any suitable device containing a hard disk drive. The present invention may implement either or both signal processing and/or control circuitry, which are generally identified in FIG. 8A at 802. In some implementations, signal processing and/or control circuitry 802 and/or other circuits (not shown) in HDD 800 may process data, perform coding and/or encryption, perform calculations, and/or format data that is output to and/or received from a magnetic storage medium 806 or any other suitable read channel. Sync mark detection circuitry 804, which may be in communication with signal processing and/or control circuitry 802, is configured to detect sector sync marks on magnetic storage medium 806 using the sync mark detection as described in more detail above in processes 600A and 600B in FIGS. 6A and 6B.

Although sync mark detection circuitry 804 is shown separate from signal processing and/or control circuitry 802, in practice these two components may be integrated or combined into a single device or component, if desired. Sync mark detection circuitry 804 may include at least one PLL or similar circuitry to establish at least one timing phase based on a sector preamble read from magnetic storage medium 806. Sync mark detection circuitry 804 may also include any number of accumulators and suitable logic blocks for implementing a sync mark detector and/or a Viterbi detector. Correlation detection may then be performed using the established timing parameters to detect sync marks on magnetic storage medium 806.

In some embodiments, sync mark detection circuitry 804 may be configured to selectively use both correlation detection and traditional Viterbi-based detection. In these embodiments, a detection type control signal 811 may be asserted when correlation detection is to be used to detect sync marks, and the detection type control signal may be deasserted when Viterbi-based detection is to be used to detect sync marks. The sync mark detection type (i.e., Viterbi-based or correlation-based) may be dynamically altered on-the-fly, if desired, by reading the detection type control signal before each sector preamble read.

HDD 800 may communicate with a host device (not shown) such as a computer, mobile computing devices such as personal digital assistants, cellular phones, media or MP3 players and the like, and/or other devices via one or more wired or wireless communication links 808. HDD 800 may be connected to memory 809 such as random access memory (RAM), low latency nonvolatile memory such as flash memory, read only memory (ROM) and/or other suitable electronic data storage.

Figure 8B:
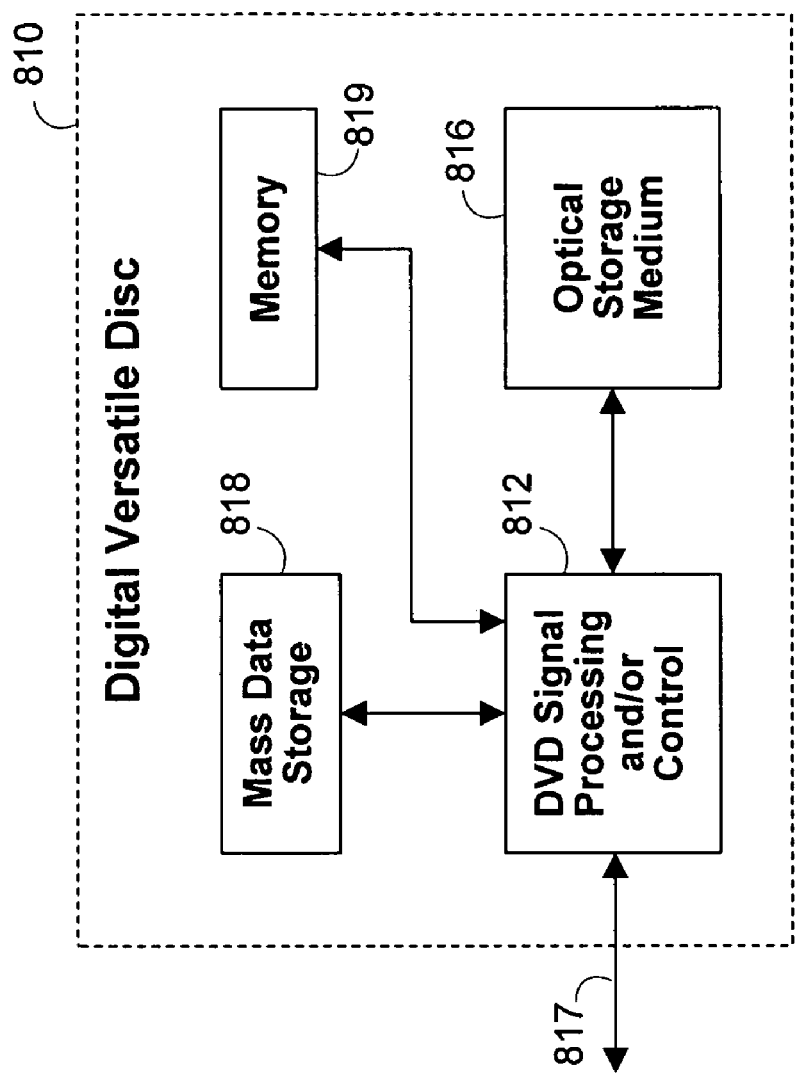
FIG. 8B is a block diagram of an exemplary digital versatile disk that can employ the disclosed technology.

Referring now to FIG. 8B, the present invention may be embodied in a digital versatile disk (DVD) drive 810. The present invention may implement either or both signal processing and/or control circuits, which are generally identified in FIG. 8B at 812, and/or mass data storage 818 of DVD drive 810. Signal processing and/or control circuit 812 and/or other circuits (not shown) in DVD 810 may process data, perform coding and/or encryption, perform calculations, and/or format data that is read from and/or data written to an optical storage medium 816. In some implementations, signal processing and/or control circuit 812 and/or other circuits (not shown) in DVD 810 can also perform other functions such as encoding and/or decoding and/or any other signal processing functions associated with a DVD drive.

DVD drive 810 may communicate with an output device (not shown) such as a computer, television or other device via one or more wired or wireless communication links 817. DVD 810 may communicate with mass data storage 818 that stores data in a nonvolatile manner. Mass data storage 818 may include a hard disk drive (HDD) such as that shown in FIG. 8A. The HDD may be a mini HDD that includes one or more platters having a diameter that is smaller than approximately 1.8"DVD 810 may be connected to memory 819, such as RAM, ROM, low latency nonvolatile memory such as flash memory, and/or other suitable electronic data storage.

Figure 8C:
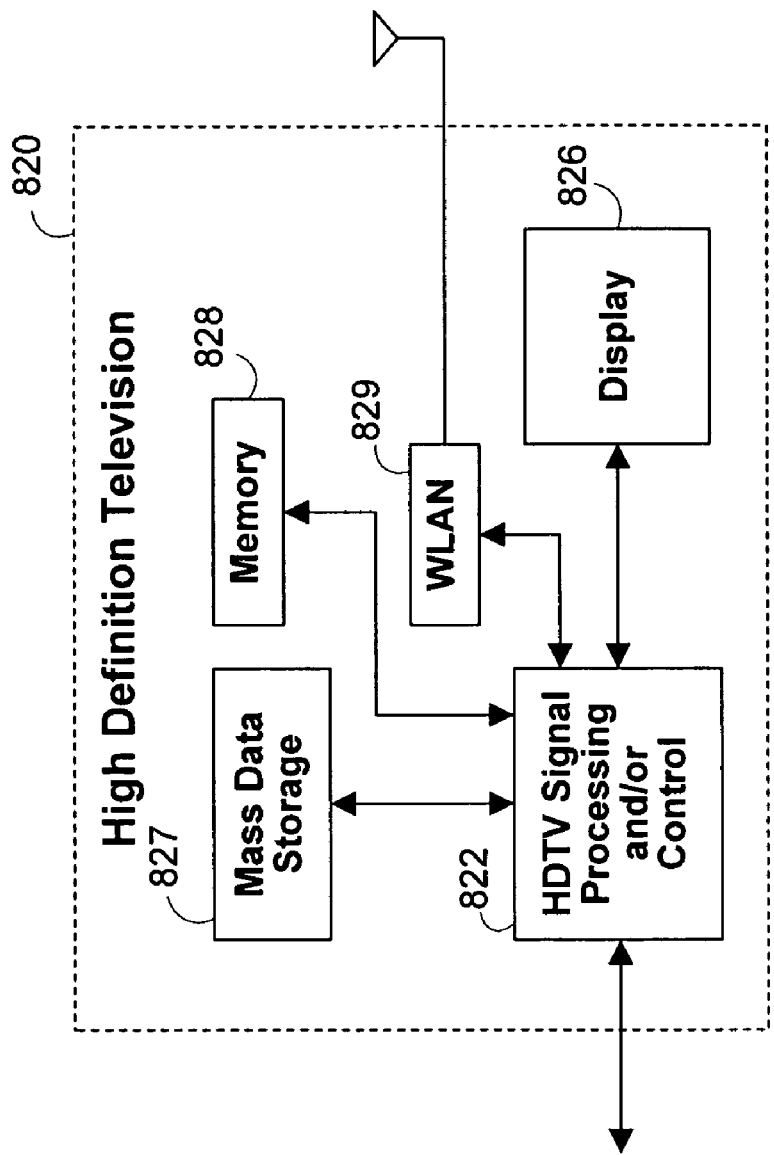
FIG. 8C is a block diagram of an exemplary high definition television that can employ the disclosed technology.

Referring now to FIG. 8C, the present invention may be embodied in a high definition television (HDTV) 820. The present invention may implement either or both signal processing and/or control circuits, which are generally identified in FIG. 8C at 822, a WLAN interface and/or mass data storage of the HDTV 820. HDTV 820 receives HDTV input signals in either a wired or wireless format and generates HDTV output signals for a display 826. In some implementations, signal processing circuit and/or control circuit 822 and/or other circuits (not shown) of HDTV 820 may process data, perform coding and/or encryption, perform calculations, format data and/or perform any other type of HDTV processing that may be required.

HDTV 820 may communicate with mass data storage 827 that stores data in a nonvolatile manner such as optical and/or magnetic storage devices. At least one HDD may have the configuration shown in FIG. 8A and/or at least one DVD may have the configuration shown in FIG. 8B. The HDD may be a mini HDD that includes one or more platters having a diameter that is smaller than approximately 1.8". HDTV 820 may be connected to memory 828 such as RAM, ROM, low latency nonvolatile memory such as flash memory and/or other suitable electronic data storage. HDTV 820 also may support connections with a WLAN via a WLAN network interface 829.

Figure 8D:
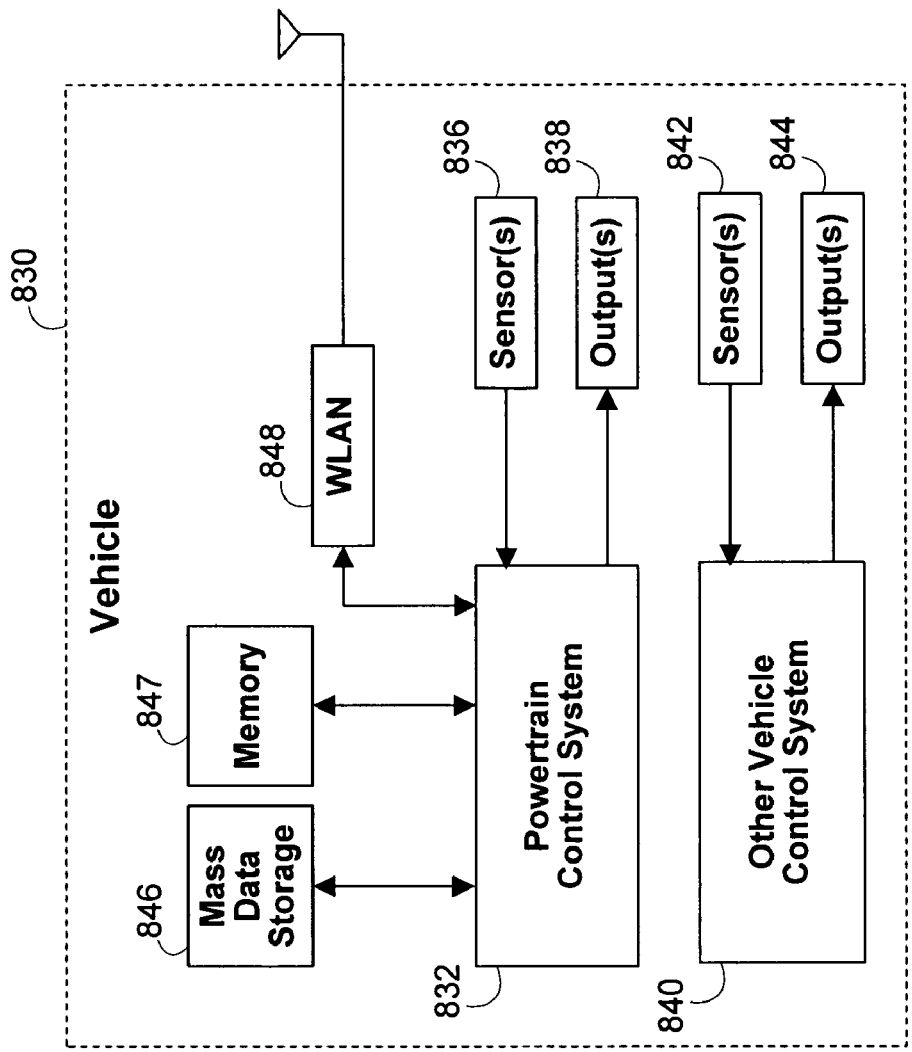
FIG. 8D is a block diagram of an exemplary vehicle that can employ the disclosed technology.

Referring now to FIG. 8D, the present invention implements a control system of a vehicle 830, a WLAN interface and/or mass data storage of the vehicle control system. In some implementations, the present invention implements a powertrain control system 832 that receives inputs from one or more sensors such as temperature sensors, pressure sensors, rotational sensors, airflow sensors and/or any other suitable sensors and/or that generates one or more output control signals such as engine operating parameters, transmission operating parameters, and/or other control signals.

The present invention may also be embodied in other control systems 840 of vehicle 830. Control system 840 may likewise receive signals from input sensors 842 and/or output control signals to one or more output devices 844. In some implementations, control system 840 may be part of an anti-lock braking system (ABS), a navigation system, a telematics system, a vehicle telematics system, a lane departure system, an adaptive cruise control system, a vehicle entertainment system such as a stereo, DVD, compact disk and the like. Still other implementations are contemplated.

Powertrain control system 832 may communicate with mass data storage 846 that stores data in a nonvolatile manner. Mass data storage 846 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Powertrain control system 832 may be connected to memory 847 such as RAM, ROM, low latency nonvolatile memory such as flash memory and/or other suitable electronic data storage. Powertrain control system 832 also may support connections with a WLAN via a WLAN network interface 848. The control system 840 may also include mass data storage, memory and/or a WLAN interface (all not shown).

Figure 8E:
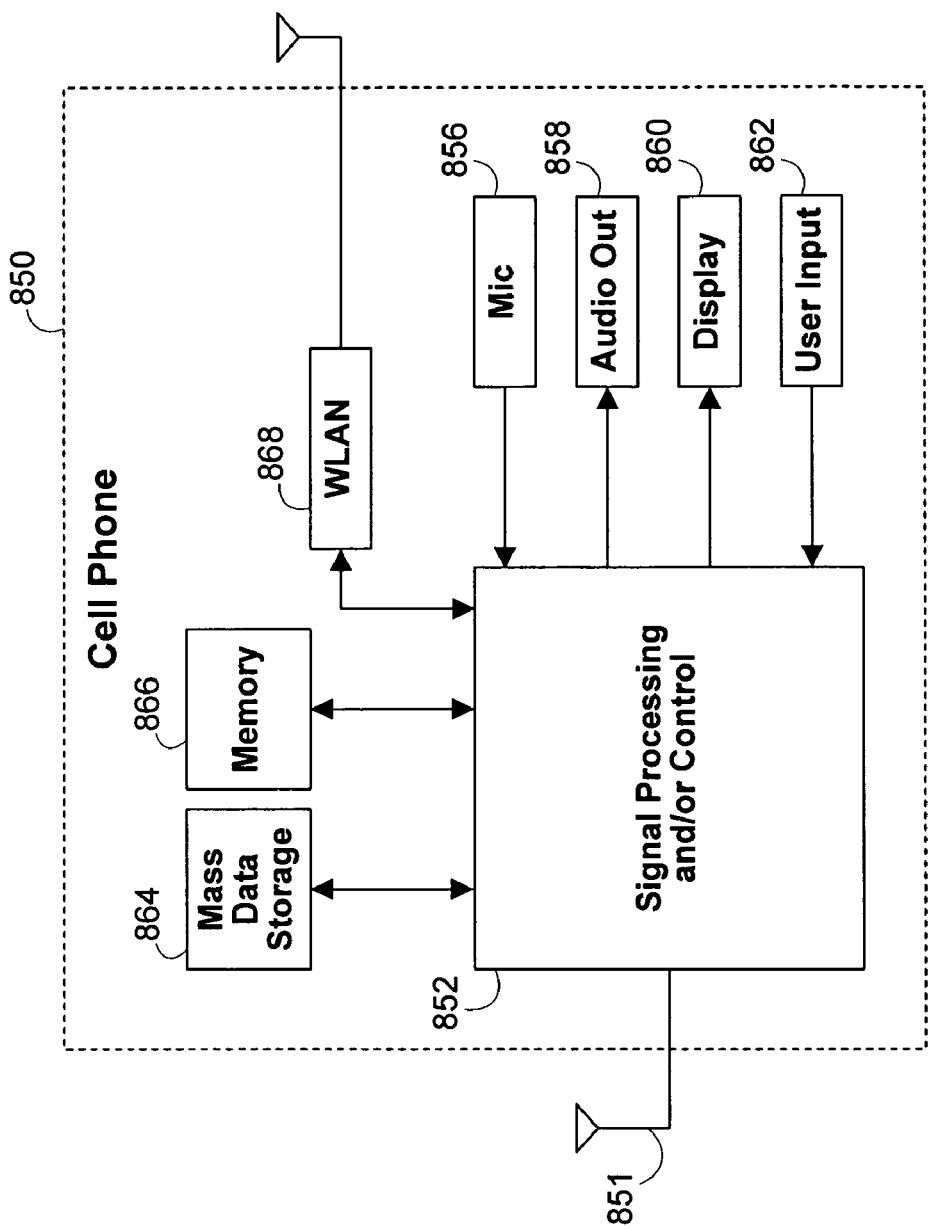
FIG. 8E is a block diagram of an exemplary cell phone that can employ the disclosed technology.

Referring now to FIG. 8E, the present invention may be embodied in a cellular phone 850 that may include a cellular antenna 851. The present invention may implement either or both signal processing and/or control circuits, which are generally identified in FIG. 8E at 852, a WLAN interface and/or mass data storage of the cellular phone 850. In some implementations, cellular phone 850 includes a microphone 856, an audio output 858 such as a speaker and/or audio output jack, a display 860 and/or an input device 862 such as a keypad, pointing device, voice actuation and/or other input device. Signal processing and/or control circuits 852 and/or other circuits (not shown) in cellular phone 850 may process data, perform coding and/or encryption, perform calculations, format data and/or perform other cellular phone functions.

Cellular phone 850 may communicate with mass data storage 864 that stores data in a nonvolatile manner such as optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Cellular phone 850 may be connected to memory 866 such as RAM, ROM, low latency nonvolatile memory such as flash memory and/or other suitable electronic data storage. Cellular phone 850 also may support connections with a WLAN via a WLAN network interface 868.

Figure 8F:
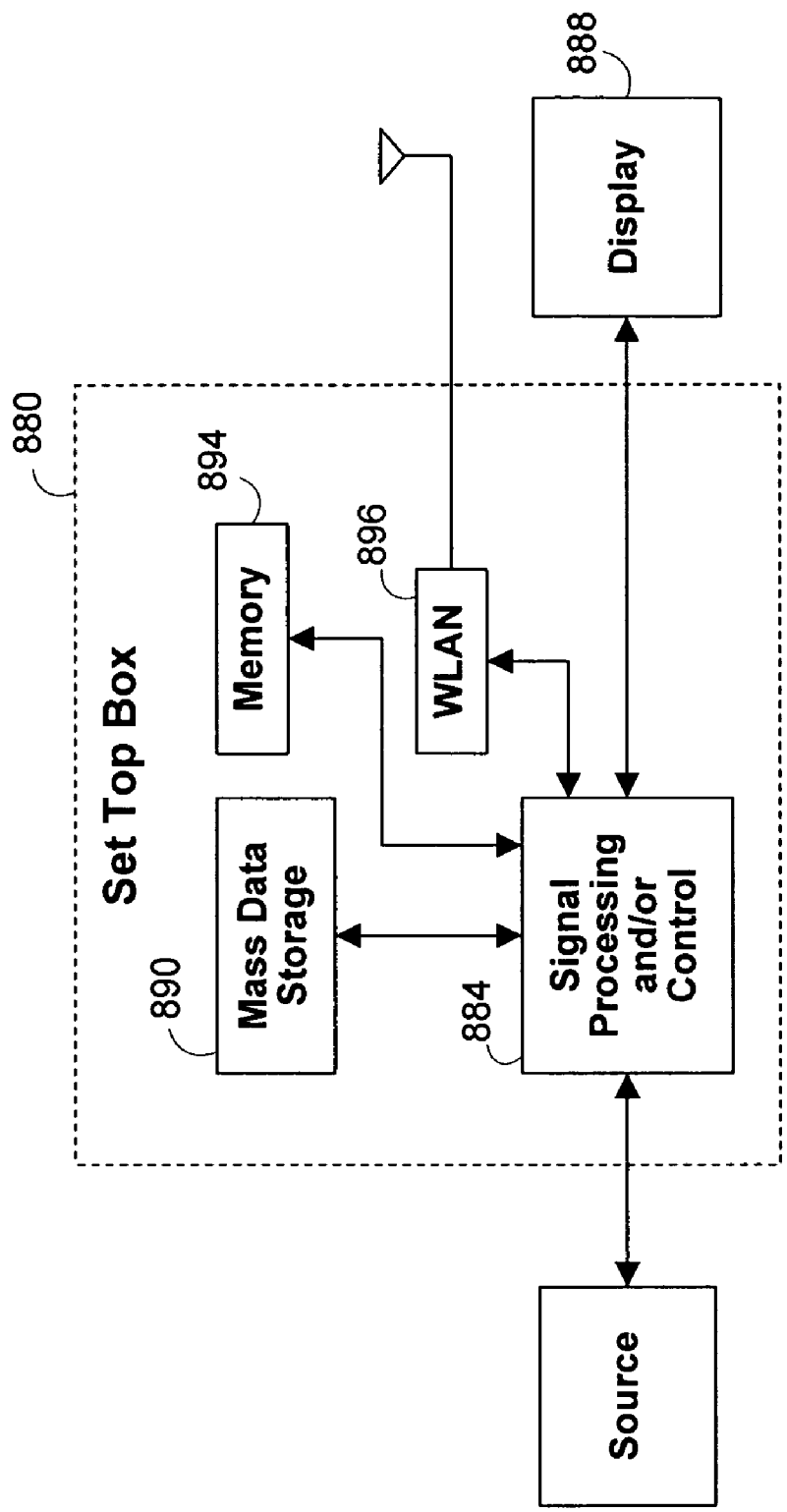
FIG. 8F is a block diagram of an exemplary set top box that can employ the disclosed technology.

Referring now to FIG. 8F, the present invention may be embodied in a set top box 880. The present invention may implement either or both signal processing and/or control circuits, which are generally identified in FIG. 8F at 884, a WLAN interface and/or mass data storage of the set top box 880. Set top box 880 receives signals from a source such as a broadband source and outputs standard and/or high definition audio/video signals suitable for a display 888 such as a television and/or monitor and/or other video and/or audio output devices. Signal processing and/or control circuits 884 and/or other circuits (not shown) of the set top box 880 may process data, perform coding and/or encryption, perform calculations, format data and/or perform any other set top box function.

Set top box 880 may communicate with mass data storage 890 that stores data in a nonvolatile manner. Mass data storage 890 may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Set top box 880 may be connected to memory 894 such as RAM, ROM, low latency nonvolatile memory such as flash memory and/or other suitable electronic data storage. Set top box 880 also may support connections with a WLAN via a WLAN network interface 896.

Figure 8G:
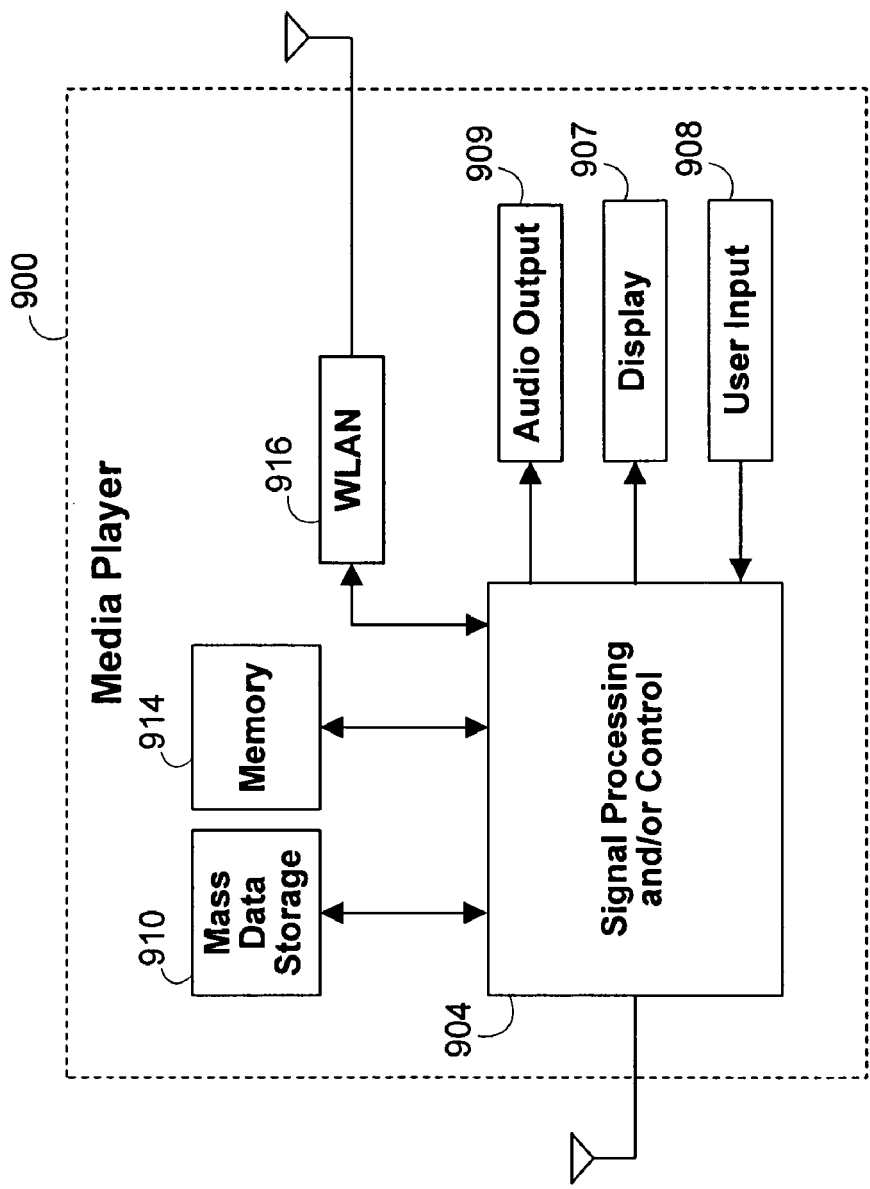
FIG. 8G is a block diagram of an exemplary media player that can employ the disclosed technology.

Referring now to FIG. 8G, the present invention may be embodied in a media player 900. The present invention may implement either or both signal processing and/or control circuits, which are generally identified in FIG. 8G at 904, a WLAN interface and/or mass data storage of the media player 900. In some implementations, media player 900 includes a display 907 and/or a user input 908 such as a keypad, touchpad and the like. In some implementations, media player 900 may employ a graphical user interface (GUI) that typically employs menus, drop down menus, icons and/or a point-and-click interface via display 907 and/or user input 908. Media player 900 further includes an audio output 909 such as a speaker and/or audio output jack. Signal processing and/or control circuits 904 and/or other circuits (not shown) of media player 900 may process data, perform coding and/or encryption, perform calculations, format data and/or perform any other media player function.

Media player 900 may communicate with mass data storage 910 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. At least one HDD may have the configuration shown in FIG. 8A and/or at least one DVD may have the configuration shown in FIG. 8B. The HDD may be a mini HDD that includes one or more platters having a diameter that is smaller than approximately 1.8". Media player 900 may be connected to memory 914 such as RAM, ROM, low latency nonvolatile memory such as flash memory and/or other suitable electronic data storage. Media player 900 also may support connections with a WLAN via a WLAN network interface 916. Still other implementations in addition to those described above are contemplated.

It will be understood that the foregoing is only illustrative of the principles of the invention, and that various modifications can be made by those skilled in the art without departing from the scope and spirit of the invention.

What is claimed is:

1. A method for detecting a disk sync mark on at least one timing interval, the method comprising:
   acquiring a plurality of data readout bits from a particular disk sector via a read head of a data read channel;
   calculating a set of Hamming distances between the disk sync mark and at least shifted or flipped disk sync mark;
   calculating a set of thresholds based, at least in part, on the set of Hamming distances and a transition probability;
   calculating a Hamming distance between the data readout bits and an expected disk sync mark; and
   comparing the Hamming distance between the data readout bits and the expected disk sync mark to at least one threshold of the set of thresholds.

2. The method of claim 1, wherein calculating the set of Hamming distances comprises calculating a minimum Hamming distance between the disk sync mark and at least one shifted or flipped disk sync mark.

3. The method of claim 1, wherein calculating the set of thresholds comprises determining whether a polarity of the read head while reading a previous disk sector was positive.

4. The method of claim 3, wherein determining whether the polarity of the read head while reading the previous disk sector was positive is based on detecting the disk sync mark in the previous disk sector.

5. The method of claim 3, wherein determining whether the polarity of the read head while reading the previous disk sector was negative is based on detecting a flipped version of the disk sync mark in the previous disk sector.

6. The method of claim 3, wherein the at least one timing interval comprises a period of a sector preamble readback waveform, and wherein calculating the set of Hamming distances further comprises:
   calculating a minimum Hamming distance, d0, between the disk sync mark and a period right-shifted version of the disk sync mark; and
   calculating a minimum Hamming distance, d1, between the disk sync mark and a half-period right-shifted version of a flipped version of the period right-shifted version of the disk sync mark.

7. The method of claim 6, wherein a first threshold in the set of thresholds is calculated based on the expression:

$$\left\lfloor \frac{d0-1}{2} \right\rfloor$$

8. The method of claim 7, wherein the polarity of the read head while reading the previous disk sector is determined to be positive, the at least one timing interval comprises the period of a sector preamble readback waveform, and the threshold is the first threshold.

9. The method of claim 7, wherein the polarity of the read head while reading the previous disk sector is determined to be negative, the at least one timing interval comprises the half period of a sector preamble readback waveform, and the threshold is the first threshold.

10. The method of claim 6, wherein a second threshold in the set of thresholds is calculated based on the expression:

$$d1 - \left\lfloor \frac{d0-1}{2} \right\rfloor$$

11. The method of claim 10, wherein the polarity of the read head while reading the previous disk sector is determined to be positive, the at least one timing interval comprises a half period of a sector preamble readback waveform, and the threshold is the second threshold.

12. The method of claim 10, wherein the polarity of the read head while reading the previous disk sector is determined to be negative, the at least one timing interval comprises the period of the sector preamble readback waveform, and the threshold is the second threshold.

13. The method of claim 3, wherein the at least one timing interval comprises a half period of a sector preamble readback waveform, and wherein calculating the set of Hamming distances further comprises:
   calculating a minimum Hamming distance, d0, between a flipped version of the disk sync mark and a period right-shifted version of the disk sync mark; and
   calculating a minimum Hamming distance, d1, between the disk sync mark and a half period right-shifted version of the flipped version of the disk sync mark.

14. The method of claim 1, wherein the at least one timing interval comprises a period of a sector preamble readback waveform, and calculating a Hamming distance between the data readout bits and an expected disk sync mark further comprises calculating the Hamming distance between the data readout bits and the disk sync mark.

15. The method of claim 1, wherein the at least one timing interval comprises a half period of a sector preamble readback waveform, and calculating a Hamming distance between the data readout bits and an expected disk sync mark further comprises calculating the hamming distance between the data readout bits and a flipped version of the disk sync mark.

16. The method of claim 1, further comprising producing a detection decision based on said comparison.

17. The method of claim 16, wherein the detection decision indicates that the disk sync mark has been detected based on the Hamming distance between the data readout bits and an expected disk sync mark being less than or equal to the threshold.

18. The method of claim 16, wherein the detection decision indicates that the disk sync mark has not been found based on the Hamming distance between the data readout bits and an expected disk sync mark being greater than at least one threshold of the set of thresholds.

19. The method of claim 16, wherein the detection decision indicates the polarity of the read head while reading the previous disk sector.

20. An apparatus for detecting a disk sync mark in at least one timing interval, the apparatus comprising:
   means for acquiring a plurality of data readout bits from a particular disk sector via a read head of a data read channel;
   means for calculating a set of Hamming distances between the disk sync mark and at least one shifted or flipped disk sync mark;

means for calculating a set of thresholds based, at least in part, on the set of Hamming distances and a transition probability;

means for calculating a Hamming distance between the data readout bits and the expected disk sync mark; and means for comparing the Hamming distance between the data readout bits and an expected disk sync mark to at least one threshold of the set of thresholds.

21. The apparatus of claim 20, wherein the means for calculating the set of Hamming distances comprises means for calculating a minimum Hamming distance between the disk sync mark and at least one shifted or flipped disk sync mark.

22. The apparatus of claim 20, wherein the means for calculating the set of thresholds comprises means for determining whether a polarity of the read head while reading the previous disk sector was positive.

23. The apparatus of claim 22, wherein the means for determining whether a polarity of the read head while reading a previous disk sector was positive further comprises means for determining whether the polarity of the read head while reading the previous disk sector was positive based on detecting the disk sync mark in a previous disk sector.

24. The apparatus of claim 22, wherein the means for determining whether a polarity of the read head while reading a previous disk sector was positive further comprises means for determining whether the polarity of the read head while reading the previous disk sector was negative based on detecting a flipped version of the disk sync mark in a previous disk sector.

25. The apparatus of claim 22, wherein the at least one timing interval comprises a period of a sector preamble readback waveform, and wherein the means for calculating the set of Hamming distances further comprises:

means for calculating a minimum Hamming distance, d0, between the disk sync mark and a period right-shifted version of the disk sync mark; and means for calculating a minimum Hamming distance, d1, between the disk sync mark and a half-period right-shifted version of a flipped version of the period right-shifted version of the disk sync mark.

26. The apparatus of claim 25, wherein a first threshold in the set of thresholds is calculated based on the expression:

$$\left\lfloor \frac{d0 - 1}{2} \right\rfloor$$

27. The apparatus of claim 26, wherein the polarity of the read head while reading the previous disk sector is determined to be positive, the at least one timing interval comprises the period of the sector preamble readback waveform, and the threshold is the first threshold.

28. The apparatus of claim 26, wherein the polarity of the read head while reading the previous disk sector is determined to be negative, the at least one timing interval comprises a half period of a sector preamble readback waveform, and the threshold is the first threshold.

29. The apparatus of claim 25, wherein a second threshold in the set of thresholds is calculated based on the expression:

$$d1 - \left\lfloor \frac{d0 - 1}{2} \right\rfloor$$

30. The apparatus of claim 29, wherein the polarity of the read head while reading the previous disk sector is determined to be positive, the at least one timing interval comprises a half period of a sector preamble readback waveform, and the threshold is the second threshold.

31. The apparatus of claim 29, wherein the polarity of the read head while reading the previous disk sector is determined to be negative, the at least one timing interval comprises the period of the sector preamble readback waveform, and the threshold is the second threshold.

32. The apparatus of claim 20, wherein the at least one timing interval comprises a half period of a sector preamble readback waveform, and wherein the means for calculating the set of Hamming distances further comprises:

means for calculating a minimum Hamming distance, d0, between a flipped version of the disk sync mark and a period right-shifted version of the disk sync mark; and means for calculating a minimum Hamming distance, d1, between the disk sync mark and a half period right-shifted version of the flipped version of the disk sync mark.

33. The apparatus of claim 20, wherein the at least one timing interval comprises a period of a sector preamble readback waveform, and the means for calculating a Hamming distance between the data readout bits and an expected disk sync mark further comprises means for calculating the Hamming distance between the data readout bits and the disk sync mark.

34. The apparatus of claim 20, wherein the at least one timing interval comprises a half period of a sector preamble readback waveform, and the means for calculating a Hamming distance between the data readout bits and an expected disk sync mark further comprises means for calculating the hamming distance between the data readout bits and a flipped version of the disk sync mark.

35. The apparatus of claim 20, further comprising producing a detection decision based on said comparison.

36. The apparatus of claim 35, wherein the detection decision indicates that the disk sync mark has been detected based on the Hamming distance between the data readout bits and an expected disk sync mark being less than or equal to the threshold.

37. The apparatus of claim 35, wherein the detection decision indicates that the disk sync mark has not been found based on the Hamming distance between the data readout bits and an expected disk sync mark being greater than the at least one threshold of the set of thresholds.

38. The apparatus of claim 35, wherein the detection decision indicates a polarity of the read head while reading the previous disk sector.

39. A system for detecting a disk sync mark in at least one timing interval, the system comprising:

hard drive control circuitry configured to acquire a plurality of data readout bits from a particular disk sector via a read head of a data read channel; and sync mark detection circuitry configured to:

calculate a set of Hamming distances between the disk sync mark and at least one shifted or flipped disk sync mark;

calculate a set of thresholds based, at least in part, on the set of Hamming distances and a transition probability;

calculate a Hamming distance between the data readout bits and an expected disk sync mark; and compare the Hamming distance between the data readout bits and the expected disk sync mark to at least one threshold of the set of thresholds.

40. The system of claim 39, wherein the sync mark detection circuitry is further configured to calculate a minimum Hamming distance between the disk sync mark and at least one shifted or flipped disk sync mark.

41. The system of claim 39, wherein the sync mark detection circuitry is further configured to calculate whether a polarity of the read head while reading a previous disk sector was positive.

42. The system of claim 41, wherein the sync mark detection circuitry is further configured to determine whether the polarity of the read head while reading the previous disk sector was positive based on detecting the disk sync mark in the previous disk sector.

43. The system of claim 41, wherein the sync mark detection circuitry is further configured to determine whether the polarity of the read head while reading the previous disk sector was negative based on detecting a flipped version of the sync mark in the previous disk sector.

44. The system of claim 41, wherein the at least one timing interval comprises a period of a sector preamble readback waveform, and wherein the sync mark detection circuitry is further configured to:

calculate a minimum Hamming distance, d0, between the disk sync mark and a period right-shifted version of the disk sync mark; and calculate a minimum Hamming distance, d1, between the disk sync mark and a half-period right-shifted version of a flipped version of the period right-shifted version of the disk sync mark.

45. The system of claim 44, wherein the sync mark detection circuitry is further configured to calculate a first threshold in the set of thresholds based on the expression:

$$\left\lfloor \frac{d0-1}{2} \right\rfloor$$

46. The system of claim 45, wherein the polarity of the read head while reading the previous disk sector is determined to be positive, the at least one timing interval comprises the period of the sector preamble readback waveform, and the threshold is the first threshold.

47. The system of claim 45, wherein the polarity of the read head while reading the previous disk sector is determined to be negative, the at least one timing interval comprises the half period of a sector preamble readback waveform, and the threshold is the first threshold.

48. The system of claim 44, wherein the sync mark detection circuitry is further configured to calculate a second threshold in the set of thresholds based on the expression:

$$d1 - \left\lfloor \frac{d0-1}{2} \right\rfloor$$

49. The system of claim 48, wherein the polarity of the read head while reading the previous disk sector is determined to be positive, the at least one timing interval comprises the half period of the sector preamble readback waveform, and the threshold is the second threshold.

50. The system of claim 48, wherein the polarity of the read head while reading the previous disk sector is determined to be negative, the at least one timing interval comprises a period of a sector preamble readback waveform, and the threshold is the second threshold.

51. The system of claim 39, wherein the at least one timing interval comprises the half period of a sector preamble readback waveform, and wherein the sync mark detection circuitry is further configured to:

calculate a minimum Hamming distance, d0, between a flipped version of the disk sync mark and a period right-shifted version of the disk sync mark; and calculate a minimum Hamming distance, d1, between the disk sync mark and a half period right-shifted version of the flipped version of the disk sync mark.

52. The system of claim 39, wherein the at least one timing interval comprises a period of a sector preamble readback waveform, and wherein the sync mark detection circuitry is further configured to calculate the Hamming distance between the data readout bits and the disk sync mark.

53. The system of claim 39, wherein the at least one timing interval comprises a half period of a sector preamble readback waveform, and wherein the sync mark detection circuitry is further configured to calculate the hamming distance between the data readout bits and a flipped version of the disk sync mark.

54. The system of claim 39, wherein the sync mark detection circuitry is further configured to produce a detection decision based on said comparison.

55. The system of claim 54, wherein the detection decision indicates that the disk sync mark has been detected based on the Hamming distance between the data readout bits and an expected disk sync mark being less than or equal to the at least one threshold of the set of thresholds.

56. The system of claim 54, wherein the detection decision indicates that the disk sync mark has not been found based on the Hamming distance between the data readout bits and an expected disk sync mark being greater than the threshold.

57. The system of claim 54, wherein the detection decision indicates a polarity of the read head while reading the previous disk sector.

\* \* \* \* \*